(12) United States Patent
Kodama et al.

(10) Patent No.: US 10,515,410 B2
(45) Date of Patent: Dec. 24, 2019

(54) METHOD AND SYSTEM FOR CALCULATING AND PROVIDING INITIAL MARGIN UNDER THE STANDARD INITIAL MARGIN MODEL

(71) Applicant: International Swaps and Derivatives Association, Inc., New York, NY (US)

(72) Inventors: Tomo Kodama, New York, NY (US); Nicholas Steele, New York, NY (US); Alistair Smith, London (GB); Athanassios Diplas, Chatham, NJ (US); Oliver Frankel, New York, NY (US); Kevin Krabbenhoeft, Greenwich, CT (US); Robert Liu, New York, NY (US); Hitanshi Thaman, New York, NY (US)

(73) Assignee: International Swaps and Derivatives Association, Inc., New York, NY (US)

( * ) Notice: Subject to any disclaimer, the term of this patent is extended or adjusted under 35 U.S.C. 154(b) by 620 days.

(21) Appl. No.: 15/143,347

(22) Filed: Apr. 29, 2016

(65) Prior Publication Data
US 2016/0321753 A1 Nov. 3, 2016

Related U.S. Application Data

(60) Provisional application No. 62/154,261, filed on Apr. 29, 2015, provisional application No. 62/243,973, filed on Oct. 20, 2015.

(51) Int. Cl.
*G06Q 40/04* (2012.01)
*G06Q 40/06* (2012.01)
(52) U.S. Cl.
CPC .............. *G06Q 40/04* (2013.01); *G06Q 40/06* (2013.01)

(58) Field of Classification Search
CPC .... G06Q 40/04; G06Q 40/06; G06Q 30/0251; G06Q 30/0276
(Continued)

(56) References Cited

U.S. PATENT DOCUMENTS

| 2007/0055609 A1* | 3/2007 | Whitehurst | G06Q 40/00 705/37 |
| 2008/0065425 A1* | 3/2008 | Giuffre | G06Q 10/0635 705/4 |

(Continued)

FOREIGN PATENT DOCUMENTS

| WO | WO-0225398 A2 * | 3/2002 | G06Q 40/04 |

OTHER PUBLICATIONS

International Financial Review (IFR): ISDA AGM: Swaps margin rules show fragmentation, Thomson Reuters, Apr. 14, 2016, pp. 1-2 (Year: 2016).*

(Continued)

*Primary Examiner* — Bijendra K Shrestha
(74) *Attorney, Agent, or Firm* — Crowell & Moring LLP

(57) ABSTRACT

A Standard Initial Margin Model (SIMM) is calculated and provided as an overall initial margin for non-cleared derivatives. In certain embodiments, using at least one computing device, information associated with a plurality of risk classes is acquired, and a delta margin, a vega margin, and a curvature margin for each risk class based on the acquired information associated is determined. The at least one computing device calculates initial margin for each risk class by summing the respective delta margin, the respective vega margin, and the respective curvature margin. The at least one computing device determines whether product classes will be used in calculating the overall initial margin, calculates the overall initial margin using an equation based on the determination, and provides the overall initial margin. The (Continued)

amount of the initial margin call for the underlying derivatives contract may then be generated based on the calculated initial margin.

22 Claims, 10 Drawing Sheets

(58) Field of Classification Search
USPC .......................................................... 705/37
See application file for complete search history.

(56) References Cited

U.S. PATENT DOCUMENTS

| | | | |
|---|---|---|---|
| 2014/0067721 A1* | 3/2014 | Hadi | G06Q 40/00 705/36 R |
| 2014/0156509 A1* | 6/2014 | Hendrix | G06Q 40/02 705/39 |
| 2014/0351169 A1* | 11/2014 | Glinberg | G06Q 20/102 705/36 R |

OTHER PUBLICATIONS

RiskMinds 365: All About SIMM, Dec. 6, 2016, pp. 1-6. (Year: 2016).*
Basel Committee: Fundamental review of the trading book: A revised market risk framework, Oct. 2013, pp. 1-127. (Year: 2013).*
ISDA: Standard Initial Margin Model for Non-Cleared Derivatives, Dec. 2013, pp. 1-11. (Year: 2013).*
Mosconi, Paola: Sensitivity Based Approach (Hints), Apr. 27, 2015, Banca IMI, pp. 1-13. (Year: 2015).*
BaselCommittee: Fundamenta Review of Trading Book: Outstnading Issues, Dec. 2014, pp. 1-46. (Year: 2014).*
Costas, M.: ISDA launches SIMM 2.0, Sep. 8, 2017, Global Capital Euromoney Institutional Investor Plc, p. 1. (Year: 2017).*
International Search Report (PCT/ISA/220 & PCT/ISA/210) issued in PCT Application No. PCT/US16/30249 dated Aug. 15, 2016 (Three (3) pages).
Written Opinion (PCT/ISA/237) issued in PCT Application No. PCT/US16/30249 dated Aug. 15, 2016 (Four (4) pages).
"Standard Initial Margin Model for Non-Cleared Derivatives", International Swaps and Derivatives Association, Inc., Dec. 2013, Retrieved from URL: https:www2.isda.org/attachment/NjE2Ng==/SIMM%20for%20Non-cleared%2020131210.pdf [Retrieved Jul. 9, 2016] pp. 1-11 (Eleven (11) pages).
Basel Committee, "Margin requirements for non-centrally cleared derivatives", Sep. 2013, 34 total pages.
ISDA, "ISDA Standard Initial Margin Model (SIMM™) for Non-Cleared Derivatives", Dec. 2013 and "Appendix: Risk Factors and Idiosyncratic Risk", Mar. 2014, 16 total pages.

* cited by examiner

| Bucket number | Credit quality | Sector |
|---|---|---|
| 1 | Investment grade (IG) | Sovereigns including central banks |
| 2 | | Financials including government-backed financials |
| 3 | | Basic materials, energy, industrials |
| 4 | | Consumer |
| 5 | | Technology, telecommunications |
| 6 | | Health care, utilities, local government, government-backed corporates (non-financial) |
| 7 | High yield (HY) & non-rated (NR) | Sovereigns including central banks |
| 8 | | Financials including government-backed financials |
| 9 | | Basic materials, energy, industrials |
| 10 | | Consumer |
| 11 | | Technology, telecommunications |
| 12 | | Health care, utilities, local government, government-backed corporates (non-financial) |
| Residual | | |

FIG. 3A

| Bucket number | Credit quality | Sector |
|---|---|---|
| 1 | Investment grade (IG) | RMBS/CMBS |
| 2 | | Credit card, student loan ABS |
| 3 | | Auto ABS |
| 4 | High yield (HY) & non-rated (NR) | RMBS/CMBS |
| 5 | | Credit card, student loan ABS |
| 6 | | Auto ABS |
| Residual | | |

FIG. 3B

| Bucket number | Size | Region | Sector |
|---|---|---|---|
| 1 | | Emerging markets | Consumer goods and services, transportation and storage, administrative and support service activities, utilities |
| 2 | | Emerging markets | Telecommunications, industrials |
| 3 | | Emerging markets | Basic materials, energy, agriculture, manufacturing, mining and quarrying |
| 4 | | Emerging markets | Financials including gov't-backed financials, real estate activities, technology |
| 5 | | Developed markets | Consumer goods and services, transportation and storage, administrative and support service activities, utilities |
| 6 | | Developed markets | Telecommunications, industrials |
| 7 | | Developed markets | Basic materials, energy, agriculture, manufacturing, mining and quarrying |
| 8 | Large | Developed markets | Financials including gov't-backed financials, real estate activities, technology |
| 9 | | Emerging markets | All sectors |
| 10 | Small | Developed markets | All sectors |
| 11 | All | All | Indexes, Funds, ETFs |

FIG. 3C

| Red Preferred ISIN / ISIN (REQUIRED) | Select ISDA SIMM Bucket (REQUIRED) | Name of issuer / underlying (OPTIONAL) |
|---|---|---|
| XS0741962681 | CRQ 2 | ABN AMRO Bank N.V. |

FIG. 4A

| | List of Reference Entity Long Names with No ISINs | ISDA SIMM Dummy ISINs |
|---|---|---|
| 1 | ADVANTEST CORPORATION | XSSIMMADVANT |
| 2 | ASSURED GUARANTY MUNICIPAL CORP. | XSSIMMASSURE |
| 3 | CANON INC. | XSSIMMCANONI |
| 4 | DEBENHAMS FINANCE HOLDINGS LIMITED | XSSIMMDEBENH |
| 5 | Evraz Group S.A. | XSSIMMEVRAZG |
| 6 | JSC "GAZPROM" | XSSIMMGAZPRO |
| 7 | JSC VTB Bank | XSSIMMVTBBNK |
| 8 | JSC Vneshtorgbank | XSSIMMVNESHT |
| 9 | Joint Stock Company "Russian Railways" | XSSIMMRUSRAI |
| 10 | Joint Stock Company "ALFA-BANK" i | XSSIMMALFAJT |
| 11 | Open Joint-Stock Company "ALFA-BANK" i | XSSIMMALFAOP |
| 12 | Kabel Deutschland Vertrieb und Service GmbH | XSSIMMKABELD |
| 13 | Kingdom of Saudi Arabia | XSSIMMSAUDIA |
| 14 | MBIA Insurance Corporation | XSSIMMMBIACO |
| 15 | Open Joint Stock Company "Oil Company "LUKOIL" | XSSIMMLUKOIL |
| 16 | Open Joint Stock Company "Oil Company Rosneft" | XSSIMMROSNEF |
| 17 | Open Joint Stock Company "Vimpel-Communications" | XSSIMMVIMPEL |
| 18 | Republic of India | XSSIMMRINDIA |
| 19 | Russian Agricultural Bank | XSSIMMRUSAGB |
| 20 | Sberbank | XSSIMMSBERBK |
| 21 | Sompo Japan Insurance Inc. | XSSIMMSOMPOJ | i *These are different reference entities.*

FIG. 4B

| Red Preferred ISIN / ISIN (REQUIRED) | Select ISDA SIMM Bucket (REQUIRED) | Name of issuer / underlying (OPTIONAL) |
|---|---|---|
| XS0259419400 | Credit Non Q 1 | Residential Mortgage Security |

FIG. 5A

| Mortgage Index | ISDA SIMM bucket | Mortgage Index | ISDA SIMM bucket | Mortgage Index | ISDA SIMM bucket |
|---|---|---|---|---|---|
| ABX.HE.A.06-1 | 1 | CMBX.NA.AAA.7 | 1 | IOS.FN30.450.10 | 1 |
| ABX.HE.A.07-2 | 1 | CMBX.NA.AJ.1 | 1 | IOS.FN30.450.11 | 1 |
| ABX.HE.AA.06-1 | 1 | CMBX.NA.AJ.2 | 1 | IOS.FN30.500.08 | 1 |
| ABX.HE.AA.06-2 | 1 | CMBX.NA.AJ.3 | 1 | IOS.FN30.500.09 | 1 |
| ABX.HE.AA.07-1 | 1 | CMBX.NA.AJ.4 | 1 | IOS.FN30.500.10 | 1 |
| ABX.HE.AAA.06-1 | 1 | CMBX.NA.AJ.5 | 1 | IOS.FN30.550.05 | 1 |
| ABX.HE.AAA.06-2 | 1 | CMBX.NA.AM.1 | 1 | IOS.FN30.550.08 | 1 |
| ABX.HE.AAA.07-1 | 1 | CMBX.NA.AM.2 | 1 | IOS.FN30.600.08 | 1 |
| ABX.HE.AAA.07-2 | 1 | CMBX.NA.AM.3 | 1 | IOS.FN30.650.67 | 1 |
| ABX.HE.BBB.06-1 | 1 | CMBX.NA.AM.4 | 1 | MBX.FN30.450.09 | 1 |
| ABX.HE.BBB.06-2 | 1 | CMBX.NA.AM.5 | 1 | MBX.FN30.500.09 | 1 |
| ABX.HE.BBB-.06-2 | 1 | CMBX.NA.AS.6 | 1 | MBX.FN30.550.08 | 1 |
| ABX.HE.PENAAA.06-2 | 1 | CMBX.NA.BB.2 | 4 | PRIMEX.ARM.1 | 1 |
| ABX.HE.PENAAA.07-1 | 1 | CMBX.NA.BB.3 | 4 | PRIMEX.FRM.1 | 1 |
| ABX.HE.PENAAA.07-2 | 1 | CMBX.NA.BB.6 | 4 | PRIMEX.FRM.2 | 1 |
| CMBX.NA.A.1 | 1 | CMBX.NA.BB.7 | 4 | ABX.HE.A.06-2 | 1 |
| CMBX.NA.A.2 | 1 | CMBX.NA.BB.8 | 4 | ABX.HE.A.06-2 | 1 |
| CMBX.NA.A.3 | 1 | CMBX.NA.BBB.1 | 1 | ABX.HE.AA.07-2 | 1 |
| CMBX.NA.A.4 | 1 | CMBX.NA.BBB-.1 | 1 | ABX.HE.BBB-.06-1 | 1 |
| CMBX.NA.A.5 | 1 | CMBX.NA.BBB.2 | 1 | ABX.HE.PENAAA.06-1 | 1 |
| CMBX.NA.A.6 | 1 | CMBX.NA.BBB-.2 | 1 | CMBX.NA.AS.7 | 1 |
| CMBX.NA.A.7 | 1 | CMBX.NA.BBB.3 | 1 | CMBX.NA.BBB-.4 | 1 |
| CMBX.NA.AA.1 | 1 | CMBX.NA.BBB-.3 | 1 | CMBX.NA.BBB.5 | 1 |
| CMBX.NA.AA.2 | 1 | CMBX.NA.BBB.4 | 1 | CMBX.NA.AAA.8 | 1 |
| CMBX.NA.AA.3 | 1 | CMBX.NA.BBB-.6 | 1 | IOS.FN30.500.03 | 1 |
| CMBX.NA.AA.4 | 1 | CMBX.NA.BBB-.7 | 1 | IOS.FN30.350.13 | 1 |
| CMBX.NA.AA.5 | 1 | CMBX.NA.BBB-.8 | 1 | IOS.FN30.350.13 | 1 |
| CMBX.NA.AA.6 | 1 | IOS.FN30.300.12 | 1 | IOS.GII30.500.10 | 1 |
| CMBX.NA.AA.7 | 1 | IOS.FN30.300.13 | 1 | MBX.FN30.400.09 | 1 |
| CMBX.NA.AA.8 | 1 | IOS.FN30.350.10 | 1 | MBX.FN30.500.10 | 1 |
| CMBX.NA.AAA.1 | 1 | IOS.FN30.350.12 | 1 | MBX.FN30.500.10 | 1 |
| CMBX.NA.AAA.2 | 1 | IOS.FN30.400.09 | 1 | MBX.FN30.500.10 | 1 |
| CMBX.NA.AAA.3 | 1 | IOS.FN30.400.10 | 1 | MBX.FN30.600.08 | 1 |
| CMBX.NA.AAA.4 | 1 | IOS.FN30.400.11 | 1 | MBX.GII30.450.10 | 1 |
| CMBX.NA.AAA.5 | 1 | IOS.FN30.400.13 | 1 | PrimeX.ARM.2 | 1 |
| CMBX.NA.AAA.6 | 1 | IOS.FN30.450.09 | 1 | TABX.HE.07-1.06-2.BBB-.40-100 | 1 |

FIG. 5B

| ISIN (REQUIRED) | Select ISDA SIMM Bucket (REQUIRED) | Issuer Name – per Bloomberg (Optional) | Additional Identifier Type (Optional) | Input Identifier (Optional) |
|---|---|---|---|---|
| FR0000121667 | EQ 5 | Essilor International SA | | |

FIG. 6

| | Trade A executed | Firm votes on Trade A | Firms receive Utility results | Margin calls |
|---|---|---|---|---|
| | *Trade Date* (T+0) | (T+1) | (T+1) | (T+2) |
| NY: | COB 5pm EST | 4 am EST | 1pm EST | 9am EST |
| | 0 | +11hours | +9 hours | +20 hours |
| UK: | 10pm | 9am | 6pm | 2pm |
| HK/SGP: | 5am (+l) | 4pm | 1am | 9pm |
| AU: | 7am (+l) | 6pm | 3am | 11pm |

User reserve the right to further assess this timing during industry testing

FIG. 7

METHOD AND SYSTEM FOR CALCULATING AND PROVIDING INITIAL MARGIN UNDER THE STANDARD INITIAL MARGIN MODEL

CROSS REFERENCE TO RELATED APPLICATIONS

This application claims the benefit of U.S. Provisional Application No. 62/154,261, filed Apr. 29, 2015, and U.S. Provisional Application No. 62/243,973, filed Oct. 20, 2015, the contents of which are incorporated herein by reference in its entirety.

FIELD OF THE INVENTION

The invention relates to a method and system for calculating and providing an overall initial margin for non-cleared derivatives based on a novel Standard Initial Margin Model ("SIMM").

BACKGROUND

Margin models are different in nature from capital models. Risk-based margin models need to provide results, which run in time for morning margin call processes, and they also need to be transparent and amendable to dispute reconciliation. Moreover, the risk-based margin models need to run quickly so that users may be able to understand, for example, liquidity implications of potential trades and so that dispute causes can be promptly analyzed and resolved.

The Working Group on Margin Requirements ("WGMR"), an initiative run by the Basel Committee on Banking Supervision ("BCBS") and the International Organization of Securities Commissions ("IOSCO"), issued a final margin policy framework in 2013 for non-cleared, bilateral derivatives. Individual regulatory authorities across jurisdictions have started to develop their own margin rules consistent with the final framework.

Unlike the calculation of variation margin, which may be based on day-to-day valuation changes that are often directly observable, initial margin calculations largely may depend on the choice of model and the assumptions used. Under the framework set by the WGMR, firms can use their own internal models to calculate initial margin, as long as they meet certain criteria and obtain regulatory approval. However, the significant discrepancy and variance among the different internal models may raise various compatibility issues as well as inaccuracies.

In that regard, there is a need for an initial margin model for non-cleared derivatives, which may be used by market participants globally to provide a standard methodology and also to permit transparent dispute resolution while allowing consistent regulatory governance and oversight.

There is a further need to provide common classifications for the initial margin models for uncleared derivatives so that consistent implementation of the models may be achieved.

SUMMARY OF THE INVENTION

According to one example of the present disclosure, a method for calculating and providing an overall initial margin for non-cleared derivatives using a Standard Initial Margin Model (SIMM) is provided. The method includes acquiring, by at least one computing device, information associated with a plurality of risk classes and determining, by the at least one computing device, a delta margin, a vega margin, and a curvature margin for each risk class based on the acquired information associated with the plurality of risk classes. The method also includes calculating, by the at least one computing device, initial margin for each risk class by summing the respective delta margin, the respective vega margin, and the respective curvature margin and determining, by the at least one computing device, whether product classes will be used in calculating the overall initial margin. The method also includes calculating, by the at least one computing device, the overall initial margin using an equation based on the determination and providing, by the at least one computing device, the overall initial margin.

According to another example of the present disclosure, a non-transitory computer-readable medium including a set of executable instructions is provided. The set of executable instructions when executed by at least one processor causes the at least one processor to perform a method for calculating and providing an overall initial margin for non-cleared derivatives using a Standard Initial Margin Model (SIMM) The method includes acquiring information associated with a plurality of risk classes and determining a delta margin, a vega margin, and a curvature margin for each risk class based on the acquired information associated with the plurality of risk classes. The method also includes calculating initial margin for each risk class by summing the respective delta margin, the respective vega margin, and the respective curvature margin and determining whether product classes will be used in calculating the overall initial margin. The method also includes calculating the overall initial margin using an equation based on the determination and providing the overall initial margin.

According to yet another example of the present disclosure, a system for calculating and providing an overall initial margin for non-cleared derivatives using a Standard Initial Margin Model (SIMM) is provided. The system includes at least one computing device executing stored programmable instructions to: acquire information associated with a plurality of risk classes, determine a delta margin, a vega margin, and a curvature margin for each risk class based on the acquired information associated with the plurality of risk classes, calculate initial margin for each risk class by summing the respective delta margin, the respective vega margin, and the respective curvature margin, determine whether product classes will be used in calculating the overall initial margin, calculate the overall initial margin using an equation based on the determination, and provide the overall initial margin.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3A is an example table illustrating credit qualifying SIMM risk buckets in accordance with one or more aspects of the invention.

FIG. 3B is an example table illustrating credit non-qualifying SIMM risk buckets in accordance with one or more aspects of the invention.

FIG. 3C is an example table illustrating equities SIMM risk buckets in accordance with one or more aspects of the invention.

FIG. 4A is an example credit qualifying submission in accordance with one or more aspects of the invention.

FIG. 4B is an example credit qualifying dummy ISIN table in accordance with one or more aspects of the invention.

FIG. 5A is an example credit non-qualifying submission in accordance with one or more aspects of the invention.

FIG. 5B is an example credit non-qualifying mapping table in accordance with one or more aspects of the invention.

FIG. 6 is an example equities submission in accordance with one or more aspects of the invention.

FIG. 7 illustrates an example submissions and results timeline in accordance with one or more aspects of the invention.

DETAILED DESCRIPTION OF EMBODIMENTS OF THE INVENTION

Figure 1:
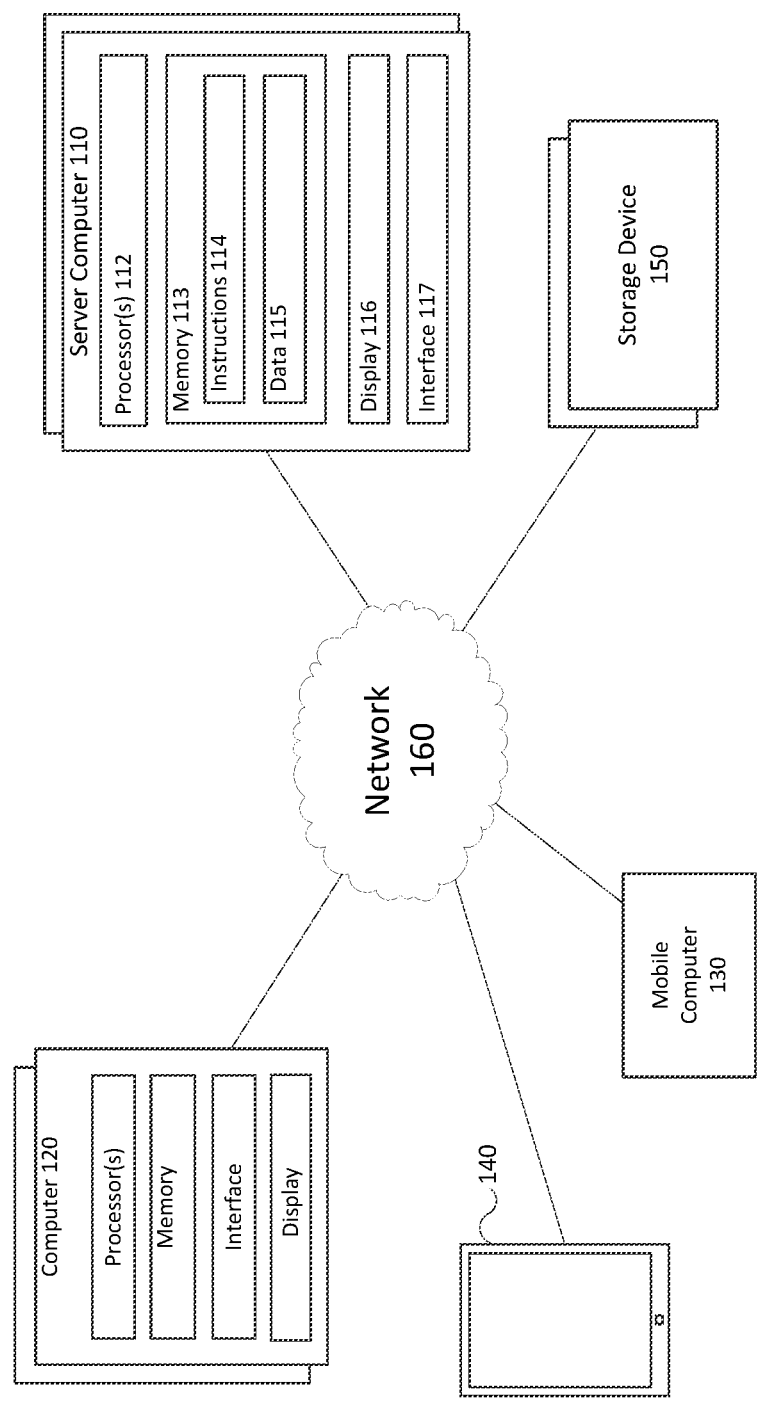
FIG. 1 illustrates an example system in accordance with one or more aspects of the invention.

FIG. 1 illustrates a system 100 in accordance with one or more aspects of the invention. For example, one or more components of the system 100 may be used to calculate and provide initial margin information using the Standard Initial Margin Model, or SIMM, for non-cleared derivatives.

In a further example, the one or more components of the system 100 may be used to treat the risk weights and correlation parameters and sensitivity values (which will be further discussed below) to be the same among all users (e.g., subscribers, parties, firms, etc.) of the SIMM in order to obtain consistent implementation of the SIMM. In this regard, the consistent application of these parameters requires consistent allocation of the net sensitivity values to the same risk buckets. For certain asset classes, one or more risk weights may be clear and/or unambiguous, and therefore treatment will be the same among the users of the SIMM. For other asset classes, such as credit and equity, in order to establish consistent allocation of net sensitivity values, the sensitivities generated to each risk factor may be mapped consistently to the risk bucket. In one example, consistency in mapping is achieved via a crowdsourcing solution (e.g., the use of crowdsourced information). For instance, the crowdsourcing solution may require the maintenance and/or dissemination of a mapping table to the SIMM users, which may map at least asset underliers to their appropriate risk buckets. The mappings may be based on "votes" submitted by the SIMM users. In this regard, the value of crowdsourced information, for example, is that it will allow parties to use consensus results instead of their internal determinations of risk buckets and weightings. It should be noted that the SIMM is inclusive and has no barriers to entry, so that it can be viable for counterparties of varying operational capabilities.

The system 100 may include a plurality of computers and/or computing devices, such as, server computer 110, computer 120, mobile computer 130, tablet computer 140, and storage device 150, all connected to network 160. For example, the server computer 110 may be a back-end system computer and include a plurality of components associated with a computer, such as one or more processors 112, memory 113 (which includes instructions 114 and data 115), display 116, and an interface 117.

The processor 112 of server computer 110 may instruct the components therein to perform certain tasks based on the processing of information, such as instructions 114 and/or data 115 that may be stored in memory 113. The processor 112 may be a standard processor, such as a central processing unit (CPU), or may be a dedicated processor, such as an application-specific integrated circuit (ASIC) or a field programmable gate array (FPGA). While one processor block is shown in FIG. 1 to depict the processor 112, the server computer 110 may also include multiple processors coupled in series and/or in parallel.

Memory 113 stores information that can be accessed by processor 112, such as instructions 114 executable by the processor 112 and data 115, which can be retrieved, manipulated or stored by the processor 112. By way of example, the memory 113 may be hardware capable of storing information accessible by the processor, such as a ROM, RAM, hard-drive, CD-ROM, DVD, write-capable, read-only, etc.

The instructions 114 may include a set of instructions to be executed directly (e.g., machine code) or indirectly (e.g., scripts) by the processor 112. The set of instructions may be included in software that can be implemented on the server computer 110. It is understood that the terms "instructions," "steps" and "programs" may be used interchangeably. For example, the instructions 114 may include at least a set of executable instructions to calculate and provide initial margin using SIMM for non-cleared derivatives. In another example, the instructions 114 may include at least a set of executable instructions to facilitate the consistent application of SIMM parameters to input sensitivities for certain asset classes and products, for example, determining the appropriate mappings to risk buckets based on "votes" submitted by the SIMM users.

The data 115 may be retrieved, stored, modified, and/or manipulated by the processor 112 in accordance with the set of instructions 114. The data 115 may be stored as a collection of data. The invention is not limited by any particular data structure and the data 115 may be stored in computer registers, in a database as a table having a plurality of different fields and records, such as an XML. The data 115 may also be formatted in any computer readable format such as, binary values, ASCII, EBCDIC (Extended Binary-Coded Decimal Interchange Code), etc.

As an example, the data 115 may include, for instance, information and data associated with the various risk classes, as will be further discussed below, such as interest rate, credit-qualifying, credit-non-qualifying, equity, commodity, and foreign exchange (FX). As a further example, the data 115 may be received by the server computer 110 from one or more users using the computer 120, the mobile computer 120, and/or the tablet computer 140, and stored in storage device 150.

Moreover, the data 115 may also include crowdsourced submissions, or votes, from SIMM users that indicate various information, such as an International Securities Identification Number ("ISIN"), that will facilitate the consistent application of SIMM parameter to input sensitivities for certain asset classes and products. As a further example, the data 115 may be received by the server computer 110 from one or more users using the computer 120, the mobile computer 120, and/or the tablet computer 140, and stored in storage device 150.

The display 116 may be any type of device capable of communicating data to a user, such as a liquid-crystal display ("LCD") screen, a plasma screen, etc. Interface 117 may be a device, port, or a connection that allows a user to communicate with the server computer 110, such as a keyboard, a mouse, touch-sensitive screen, microphone, camera, etc., and may also include one or more input/output ports, such as a universal serial bus (USB) drive, CD/DVD drive, zip drive, various card readers, etc.

The server computer 110 and additional server computers may be rack mounted on a network equipment rack and/or located in a data center. In one aspect, the server computer 110 may use the network 160 to serve the requests of programs executed on computer 120, mobile computer 130, tablet computer 140, and/or storage device 150.

Mobile computing devices, such as the mobile computer 130 (e.g., laptop, smartphone, PDA, tablet computer) and tablet computer 140, may have similar components and function to the server computer 110 and computer 120, such as a processor, memory, input/output capabilities, display, etc. and may be communicatively coupled to network 160 so as to communicate with other components of the network.

The storage device 150 of FIG. 1 may be configured to store a large quantity of data and may be accessed by other components of network 160. For example, the storage device 150 may be a collection of storage components, or a mixed collection of storage components, such as ROM, RAM, hard-drives, solid-state drives, removable drives, network storage, virtual memory, cache, registers, etc.

The network 160 may be any type of network, wired or wireless, configured to facilitate the communication and transmission of data, instructions, etc. from one component to another component. For example, the network 160 may be a local area network (LAN) (e.g., Ethernet or other IEEE 802.03 LAN technologies), Wi-Fi (e.g., IEEE 802.11 standards, wide area network (WAN), virtual private network (VPN), global area network (GAN)), or any combination thereof.

Various aspects, examples, and/or operations associated with calculating and providing initial margin using SIMM for non-cleared derivatives will now be described based on the examples illustrated in system 100 and the one or more components of the system 100 performing the methodology and calculations. The aforementioned aspects, examples, and/or operations are not required to be performed in a particular or precise order. Rather, they may be performed in a different order, different combinations, or simultaneously, etc.

SIMM Methodology

Calculations and methodology for calculating initial margin using SIMM is based on sensitivities as inputs, and the sensitivities and risk factors meet certain definitions, which will be further described below. Sensitivities may be used as inputs into aggregation equations, which may be intended to recognize hedging and diversification benefits of positions in different risk factors within a particular asset class. SIMM also includes and/or accounts for complex trades, which are handled in the same way as other trades.

In one aspect of the disclosure, there are at least two variants of the SIMM methodology: one variant does not use product classes and the second variant uses product classes. There are also at least six risk classes: (1) interest rate, (2) credit (qualifying), (3) credit (non-qualifying), (4) equity, (5) commodity, and (6) foreign exchange (FX). The margin for each risk class is defined to be the sum of a "delta margin," a "vega margin," and a "curvature margin." For example, for each risk class, X, the equation is:

$$IM_X = DeltaMargin_X + VegaMargin_X + CurvatureMargin_X.$$

For example, when product classes are not used, buckets may be defined in risk terms, so that each risk class takes its component risks from all trades, regardless of their product type. For example, a swap with both an interest rate leg and an equity performance-linked leg will be taken into account in both the interest rate and equity risk classes. For instance, interest rate sensitivities will be calculated considering offsets with interest rate exposures of "pure" interest rate trades. The interest rate and FX margins are then combined to give a joint IR/FX requirement which is given by the equation:

$$IM_{IR\&FX} = (IM_{IR}^2 + IM_{FX}^2 + 2\psi_{IRFX} IM_{IR} IM_{FX})^{1/2}$$

The correlation $\psi_{IRFX}$ has a value of 27%. The two types of credit margin are also combined to give a joint credit requirement using the formula:

$$IM_{Credit} = (IM_{CreditQual}^2 + IM_{CreditNonQual}^2 + 2\psi_{Credit} IM_{CreditQual} IM_{CreditNonQual})^{1/2}$$

The $\psi_{Credit}$ has a value that is to be determined. The overall SIMM margin requirement is the sum of four margins:

$$SIMM = IM_{IR\&FX} + IM_{Credit} + IM_{Equity} + IM_{Commodity}$$

In another example, when product classes are used, there may be at least four product classes: (1) interest rates and foreign exchange (RatesFX), (2) credit, (3) equity, and (4) commodity. Every trade is assigned to an individual product class and SIMM is considered separately for each product class. Buckets may still be defined in risk terms, but within each product class the risk class takes its component risks only from trades of that product class. For example, equity derivatives would have risk in the interest rate risk class, as well as the equity risk class. All those risks are kept separate from the risks of trades in the RatesFX product class.

Within each product class, the initial margin (IM) for each of the six risk classes is calculated. The total margin for the product class is given by the equation:

$$SIMM_{product} = \sqrt{\sum_r IM_r^2 + \sum_r \sum_{s \ne r} \psi_{rs} IM_r IM_s}$$

The product is one of the four product classes, and the sums on r and s are taken over the six risk classes. The correlation matrix $\psi_{rs}$ of correlations between the risk classes will be further described in detail below.

The total SIMM is the sum of the four product class SIMM values:

$$SIMM = SIMM_{RatesFX} + SIMM_{Credit} + SIMM_{Equity} + SIMM_{Commodity}$$

Prior to applying the delta margin calculations, positions in identical instruments may be fully offset. Instruments, including the underlying instruments of derivative instruments are considered identical when they have the same contractual parameters. This may be irrespective of whether the underlying instrument is purchased or sold according to the derivative instruments.

In a further example, the following approach is used to capture delta risk that is applied to the interest-rate risk class only. For instance, one or more computers may find a net sensitivity across instruments to each risk factor (k, i), where k is the rate tenor and i is the index name of the sub yield curve, as will be defined below for the interest-rate risk class.

Subsequently, the one or more computers weight the net sensitivity, $S_{k,i}$, to each risk factor (k, i) by the corresponding risk weight $RW_k$ based on the equation:

$$WS_{k,i} = RW_k s_{k,i} CR_b$$

CR is the concentration risk factor defined as:

$$CR_b = \max\left(1, \left(\frac{\left|\sum_{k,i} S_{k,i}\right|}{T_b}\right)^{\frac{1}{2}}\right)$$

For concentration threshold $T_b$ defined for each currency b.

The one or more computers then aggregate the weighted sensitivities within each currency.

$$K = \sqrt{\sum_{i,k} WS_{k,i}^2 + \sum_{i,k} \sum_{(j,l)\neq(i,k)} \phi_{i,j}\rho_{k,l} WS_{k,i} WS_{l,j}}$$

The sub-curve correlations $\varphi_{i,j}$ and the tenor correlations parameters $\rho_{k,l}$ are further discussed below.

Moreover, the one or more computers aggregate the delta margin amounts across currencies within the risk class.

$$DeltaMargin = \sqrt{\sum_b K_b^2 + \sum_b \sum_{c\neq b} \gamma_{bc} S_b S_c}$$

$$S_b = \max\left(\min\left(\sum_{i,k} WS_{k,i}, K_b\right), -K_b\right)$$

The correlation parameters $\gamma_{bc}$ are further discussed below.

In yet a further example, the following approach is used to capture delta risk that is applied to each risk class other than interest rate. For instance, one or more computers may be used to find a net sensitivity across instruments to each risk factor k.

Then, the one or more computers weight the net sensitivity, $s_k$, to each factor k by the corresponding risk weight $RW_k$ according to the bucketing structure for each risk class.

$$WS_k = RW_k s_k CR_k$$

Where $CR_k$ is the concentration risk factor for credit spread risk.

$$CR_k = \max\left(1, \left(\frac{\left|\sum_j s_j\right|}{T_b}\right)^{\frac{1}{2}}\right)$$

With the sum j taken over tenors of the same issuer/seniority curve as the risk weight k, and for equity, commodity, FX risk:

$$CR_k = \max\left(1, \left(\frac{\left|\sum_j s_j\right|}{T_b}\right)^{\frac{1}{2}}\right)$$

Where $T_b$ is the concentration threshold for the bucket b.

Weighted sensitivities is then aggregated within each bucket using, for example, using the following equation:

$$K = \sqrt{\sum_k WS_k^2 + \sum_k \sum_{l\neq k} \rho_{kl} WS_k WS_l}$$

Delta Margin amounts is aggregated across buckets within each risk class using, for instance, the following equation:

$$DeltaMargin = \sqrt{\sum_b K_b^2 + \sum_b \sum_{c\neq b} \gamma_{bc} S_b S_c} + K_{residual}$$

$$S_b = \max\left(\min\left(\sum_{k=1}^{k} WS_k, K_b\right), -K_b\right)$$

For all risk factors in bucket b.

Instruments that are options or include an option, including, for instance, a prepayment option or have volatility sensitivity (e.g., instruments subject to optionality) may be subject to additional margin requirements for vega risk and curvature risk. By way of example, the following approach is used to capture vega risk exposure, which may be separately applied to each risk class.

For instance, for interest rate and credit instruments, the volatility $\sigma_{kj}$ of the risk factor k at each vol-tenor j is defined to be the implied at-the-money volatility of the risk factor k, at each vol-tenor j, where "vol-tenor" is the underlying swap maturity. The volatility may be quoted as normal volatility, log-normal volatility, or the like.

For equity, FX, and commodity instruments, the volatility $\sigma_{kj}$ of the risk factor k at each vol-tenor j is given by the following equation:

$$\sigma_{kj} = \frac{RW_k \sqrt{365/14}}{\alpha}$$

Where $\alpha = \Phi^{-1}(99\%)$ and where $RW_k$ is the corresponding delta risk weight of the risk factor k, and the "vol-tenor" j is the option expiry time, which uses the following tenor buckets: 2 weeks, 1 month, 3 months, 6 months, 1 year, 2 years, 3 years, 5 years, 10 years, 15 years, 20 years, and 30 years. For commodity index volatilities, the risk weight to use is that of the "other" bucket. For FX vega (which may depend on a pair of currencies), the risk weight to use is the common risk weight for FX delta sensitivity.

The vega risk exposure for each instrument i to risk factor k is estimated using the equation:

$$VR_{ik} = VRW \sum_j \sigma_{kj} \frac{dV_i}{d\sigma}$$

Where VRW is the vega risk weight for the risk class concerned, $\sigma_{kj}$ is the volatility defined above, $$\frac{dV_i}{d\sigma}$$

is the sensitivity of the price of the instrument i with respect to the implied at-the-money volatility (e.g., "vega"), keeping skew and smile constant (this may be the log-normal vega, for a 1% increase in volatility. For example, the five year interest rate vega is the sum of all vol-weighted interest rate caplet and "swaption vegas," which expire in a time period of five years and the USD/JPY FX vega is the sum of all vol-weighted USD/JPY FX vegas.

The one or more computers then finds a net vega risk exposure $VR_k$ across instruments i to each risk factor k, which are further defined and discussed below. There may be special treatment for index volatilities in credit qualifying, equity, and commodity risk classes.

The vega risk exposure is then aggregated within each bucket. For instance, using the equation:

$$K_b = VCR_b \sqrt{\sum_k VR_k^2 + \sum_k \sum_{l \neq k} \rho_{kl} VR_k VR_l}$$

VCR is the vega concentration risk factor for bucket b, defined as:

$$VCR_b = \max\left(1, \left(\frac{\left|\sum_k VR_k\right|}{VT_b}\right)^{\frac{1}{2}}\right)$$

Where $VT_b$ is the vega concentration threshold for bucket b.

The vega margin is then aggregated across buckets within each risk class using, for instance, the following equation:

$$VegaMargin = \sqrt{\sum_b K_b^2 + \sum_b \sum_{c \neq b} \gamma_{bc} S_b S_c} + K_{residual}$$

$$S_b = \max\left(\min\left(VCR_b \sum_{k=1}^k VR_k, K_b\right), -K_b\right)$$

For all risk factors in bucket b.

In a further example of the disclosure, the following approach is used to capture curvature risk exposure applied to each risk class. For instance, the curvature risk exposure for each instrument i to risk factor k is estimated using the equation:

$$CVR_{ik} = \sum_j SF(t_{kj}) \sigma_{kj} \frac{dV_i}{d\sigma}$$

Where $\sigma_{kj}$ and $$\frac{dV_i}{d\sigma}$$

are the volatility and vega defined above, $t_{kj}$ is the expiry time (e.g., in calendar days) from the valuation date until the expiry date of the standard option corresponding to this volatility and vega, and SF(t) is the value of the scaling function obtained from the linkage between vega and gamma for vanilla options.

$$SF(t) = 0.5 \min\left(1, \frac{14 \text{ days}}{t \text{ days}}\right)$$

The scaling function is a function of expiry only, which is independent of both vega and vol, as shown in the example table below.

| Expiry | 2 w | 1 m | 3 m | 6 m | 12 m | 2 y | 3 y | 5 y | 10 y |
|---|---|---|---|---|---|---|---|---|---|
| SF | 50.0% | 23.0% | 7.7% | 3.8% | 1.9% | 1.0% | 0.6% | 0.4% | 0.2% |

The tenors are converted to calendar days using, for instance, the convention that "12 m" equals 365 calendar days, with pro-rata scaling for other tenors so that 1 m=365/12 days and 5y=365*5 days.

Subsequently, the curvature risk exposure $CVR_{ik}$ may be netted across instrument i to each risk factor k. It is to be understood that the same special treatment as for vega may apply for indexes in credit, equity, and commodity risk classes.

The curvature risk exposure is then aggregated within each bucket using, for instance, the following equation:

$$K_b = \sqrt{\sum_k CVR_{b,k}^2 + \sum_k \sum_{l \neq k} \rho_{kl}^2 CVR_{b,k} CVR_{b,l}}$$

Where $\rho_{kl}$ is the assumed correlation applicable to each risk class.

The margin is aggregated across buckets within each risk class:

$$\theta = \min\left(\frac{\sum_{b,k} CVR_{b,k}}{\sum_{b,k} |CVR_{b,k}|}, 0\right)$$

$$\lambda = (\Phi^{-1}(99.5\%)^2 - 1)(1 + \theta) - \theta$$

Where the sums are taken over all the non-residual buckets in the risk class, and $\Phi^{-1}(99.5\%)$ is the 99.5th percentile of the standard normal distribution. The non-residual curvature margin is:

$$CurvatureMargin_{non\text{-}res} =$$

$$\max\left(\sum_{b,k} CVR_{b,k} + \lambda \sqrt{\sum_b K_b^2 + \sum_b \sum_{c \neq b} \gamma_{bc}^2 S_b S_c}, 0\right)$$

$$S_b = \max\left(\min\left(\sum_{k=1} CVR_{b,k}, K_b\right), -K_b\right)$$

The residual equivalents are defined as:

$$\theta_{residual} = \min\left(\frac{\sum_k CVR_{residual,k}}{\sum_k |CVR_{residual,k}|}, 0\right)$$

-continued $$\lambda_{residual} = (\Phi^{-1}(99.5\%)^2 - 1)(1 + \theta_{residual}) - \theta_{residual}$$

$$CurvatureMargin_{residual} = \max\left(\sum_k CVR_{residual,k} + \lambda_{residual}K_{residual}, 0\right)$$

The total curvature margin may be defined to be the sum of the two terms, as defined by the following equation:

CurvatureMargin=CurvatureMargin$_{non-res}$+CurvatureMargin$_{residual}$

Definition of the Risk Factors and the Sensitivities

Definition of the Risk Factors

The interest rate risk factors are the 10 yields at the following vertices, for each currency: 3 months, 6 months, 1 year, 2 years, 3 years, 5 years, 10 years, 15 years, 20 years and 30 years. The relevant yield curve may be the yield curve of the currency in which an instrument is denominated. For a given currency, there may be a number of sub yield curves used, named, e.g., "OIS", "Libor1m", "Libor3m", "Libor6m", "Libor12m" and (for USD only) "Prime." Each sub curve has an index name i. Risk may be separately bucketed by currency, tenor and curve index, expressed as risk to the outright rate of the sub curve. Any sub curve not given on the above list is mapped to its closest equivalent. The interest rate risk factors may also include a flat inflation rate for each currency. When at least one contractual payment obligation depends on an inflation rate, the inflation rate for the relevant currency is used as a risk factor. All sensitivities to inflation rates for the same currency are fully offset.

The credit qualifying risk factors are five credit spreads for each issuer/seniority pair at each of the following vertices: 1 year, 2 years, 3 years, 5 years, and 10 years. For a given issuer/seniority, if there is more than one relevant credit spread curve, then the credit spread risk at each vertex may be the net sum of risk at that vertex over all the credit spread curves of that issuer and seniority, which may differ by documentation (such as restructuring clause), or currency. For credit qualifying indexes and bespoke baskets (including, e.g., securitizations and non-securitizations), delta sensitivities are computed to the underlying issuer/seniority risk factors. The vega sensitivities of credit indexes need not be allocated to underlying risk factors, but rather the entire index vega risk is to be classed into the appropriate credit qualifying bucket, using the residual bucket for cross-sector indexes.

The credit non-qualifying risk factors are five credit spreads for each issuer/tranche at each of the following vertices: 1 year, 2 years, 3 years, 5 years and 10 years. Sensitivities are to be computed to the tranche. For a given tranche, if there is more than one relevant credit spread curve, then the credit spread risk at each vertex may be the net sum of risk at that vertex over all the credit spread curves of that tranche. Vega sensitivities of credit indexes need not be allocated to underlying issuers, but rather the entire index vega is to be classed into the appropriate non-qualifying bucket, using the residual bucket for cross-sector indexes.

The equity risk factors are all the equity prices: each equity spot price is a risk factor. Sensitivities to equity indices, funds and ETFs can be handled in one of at least two ways: either standard approach, where the entire delta and can be put into the "Indexes, Funds, ETFs" equity bucket, or an alternative approach, if bilaterally agreed, the delta can be allocated back to individual equities. The choice between standard and alternative approach may be made on a portfolio-level basis. Delta sensitivities to bespoke baskets are allocated back to individual equities. Vega sensitivities of equity indexes, funds and ETFs need not be allocated back to individual equities, but rather the entire vega risk is to be classed into the "Indexes, Funds, ETFs" equity bucket. Vega sensitivities to bespoke baskets may be allocated back to individual equities. It is to be understood that not all institutions may be able to perform the allocation of vega for equities as described, however, it may be the preferred approach.

The commodity risk factors are all the commodity prices: each commodity spot price is a risk factor. Examples include, e.g., "Coal Europe," "Precious Metals Gold," and "Livestock Lean Hogs." Risks to commodity forward prices may be allocated back to spot price risks and aggregated, assuming that each commodity forward curve moves in parallel. Sensitivities to commodity indices can be handled in one of two ways: either (standard approach) the entire delta can be put into the "other" bucket, or (advanced approach) the delta may be allocated back to individual commodities. The choice between standard and advanced approaches is to be made on a portfolio-level basis. Delta sensitivities to bespoke baskets are allocated back to individual commodities. For example, vega sensitivities of commodity indexes may not be allocated back to individual commodities, but rather the entire index vega risk may be classed into the "other" bucket.

The FX risk factors are all the exchange rates between the reporting currency and any currency, or currency of any FX cross rate, on which the value of an instrument may depend. This may exclude the reporting currency itself. The FX vega risk factors are all the currency pairs to which an instrument has FX volatility risk.

Definition of "Sensitivity"

The following describe the sensitivity, s, that is used as input in accordance with one or more aspects of the disclosure. For interest rate and credit, sensitivity is:

$$s = V(x+1\ bp) - V(x)$$

For equity, commodity, and FX risks, sensitivity is:

$$s = V(x+1\%\cdot x) - V(x)$$

Where s is the sensitivity to the risk factor x and V(x) is the value of the instrument, given the value of the risk factor x.

Firms, such as banks, may also make use of the central or backward difference methods, or use a smaller shock size and scale-up. For example, for Interest Rate and Credit:

$$s = V(x + 0.5\ bp) - V(x - 0.5\ bp)$$

$$s = V(x) - V(x - 1\ bp)$$

$$s = \frac{V(x + \varepsilon \cdot 1\ bp) - V(x)}{\varepsilon}$$

$$0 < |\varepsilon| \le 1$$

For equity, commodity, and FX risk:

$$s = V(x + 0.5\% \cdot x) - V(x - 0.5\% \cdot x)$$

$$s = V(x) - V(x - 1\% \cdot x)$$

$$s = \frac{V(x + 1\% \cdot \varepsilon \cdot x) - V(x)}{\varepsilon}$$

$$0 < |\varepsilon| \le 1$$

For interest rate risk factors, the sensitivity is defined as the PV01. The PV01 of an instrument i with respect to t of the risk free curve r (e.g., the sensitivity of instrument i with respect to the risk factor $r_t$) is defined by the following equation:

$$s(i,r_t)=V_i(r_t+1\text{ bp},cs_t)-V_i(r_t,cs_t)$$

Where $r_t$ is the risk-free interest rate at tenor t, $cs_t$ is the credit spread at tenor t, $V_i$ is the market value of an instrument i as a function of the risk-free interest rate and credit spread curve, and 1 bp is 1 basis point, e.g., 0.0001 or 0.01%. For the interest rate risk factors, "market rates" is used to construct the risk-free yield curve.

For credit non-securitization risk factors, the sensitivity is defined as the CS01. The CS01 of an instrument with respect to tenor t is defined as:

$$s(i,cs_t)=V_i(r_t,cs_t+1\text{ bp})-V_i(r_t,cs_t)$$

For credit qualifying and non-qualifying securitizations, including nth-to-default risk factors, the sensitivity is defined as the CS01. If all the following criteria are met, the position may be deemed to be a qualifying securitization, and the CS01, as defined for credit (non-securitization) above, for instance, may be computed with respect to the names underlying the securitization or nth-to-default instrument. For example, the positions are not re-securitization positions, nor derivatives of securitization exposures that do not provide a pro-rate share in the proceeds of a securitization tranche. In another example, all reference entities are single-name products, including but not limited to single-name credit derivatives, for which a liquid two-way market exists, including but not limited to trade indices on the reference entities. In yet a further example, the instrument does not reference an underlying that would be treated as a retail exposure, a residential mortgage exposure, or a commercial mortgage exposure under the standardized approach to credit risk. In yet another example, the instrument does not reference a claim on a special purpose entity.

If any of the aforementioned criteria are not met, for instance, the position may be deemed to be non-qualifying and then the CS01 is calculated with respect to the spread of the instrument (as opposed to the spread of the underlying of the instruments). A two-way market is deemed to exist where there are independent bona fide offers to buy and sell so that a price reasonably related to the last sales price or current bona fide competitive bid and offer quotations can be determined within one day and settled at such price within a relatively short time conforming to trade custom.

For equity risk factors, the sensitivity is defined as follows. The value change of an instrument with respect to a 1 percentage point relative change of the equity price:

$$s_{ik}=V_i(EQ_k+1\%\cdot EQ_k)-V_i(EQ_k))$$

Where k is a given equity, $EQ_k$ is the market value of equity k, and $V_i$ is the market value of instrument i as a function of the price of equity k.

For commodity risk factors, the sensitivity is defined as follows. The value change of an instrument with respect to a 1 percentage point relative change of the commodity price:

$$s_{ik}=V_i(CTY_k+1\%\cdot CTY_k)-V_i(CTY_k)$$

Where k is a given commodity, $CTY_k$ is the market value of commodity k, and $V_i$ is the market value of instrument i as a function of the price of commodity k.

For FX risk factors, the sensitivity is defined as follows. The value change of an instrument with respect to a 1 percentage point relative change of the FX rate:

$$s_{ik}=V_i(FX_k+1\%\cdot FX_k)-V_i(FX_k)$$

Where k is a given currency, other than the reporting currency, $FX_k$ is the spot exchange rate between currency k and the reporting currency, expressed in units of the reporting currency for one unit of currency k, and $V_i$ is the market value of instrument i as a function of the exchange rate k. The FX sensitivity of the reporting currency itself may be excluded from the calculation. Moreover, when computing a first order sensitivity for instruments subject to optionality, it is to be understood that the volatility under the bump is adjusted per prevailing market practice in each risk class.

Interest Rate Risk

Interest Rate—Risk Weights

Each risk-free yield curve (exposures in a given currency) may be considered to be a separate bucket. The risk weights $RW_k$ are set out in the following tables. The first table is for regular volatility currencies, which are defined to be: the US Dollar (USD), Euro (EUR), British Pound (GBP), Swiss Franc (CHF), Australian Dollar (AUD), New Zealand Dollar (NZD), Canadian Dollar (CAD), Swedish Krona (SEK), Norwegian Krone (NOK), Danish Krona (DKK), Hong Kong Dollar (HKD), South Korean Won (KRW), Singapore Dollar (SGD), and Taiwanese Dollar (TWD). The second table is for low-volatility currencies, which are defined to be the Japanese Yen (JPY) only. The third table is for high-volatility currencies, which are defined to be all other currencies. The risk weight for any inflation rate of currency is 32 bps. Moreover, the vega risk weight, VRW, for the interest rate risk class is 0.18.

TABLE 1

Risk weights per vertex (regular currencies)

| 3 m | 6 m | 1 yr | 2 yr | 3 yr | 5 yr | 10 yr | 15 yr | 20 yr | 30 yr |
|---|---|---|---|---|---|---|---|---|---|
| 77 | 64 | 58 | 49 | 47 | 47 | 45 | 45 | 48 | 56 |

TABLE 2

Risk weights per vertex (low-volatility currencies)

| 3 m | 6 m | 1 yr | 2 yr | 3 yr | 5 yr | 10 yr | 15 yr | 20 yr | 30 yr |
|---|---|---|---|---|---|---|---|---|---|
| 10 | 10 | 13 | 16 | 18 | 20 | 25 | 22 | 22 | 23 |

TABLE 3

Risk weights per vertex (high-volatility currencies)

| 3 m | 6 m | 1 yr | 2 yr | 3 yr | 5 yr | 10 yr | 15 yr | 20 yr | 30 yr |
|---|---|---|---|---|---|---|---|---|---|
| 89 | 94 | 104 | 99 | 96 | 99 | 87 | 97 | 97 | 98 |

Interest Rate—Correlations

The correlation matrix below for risk exposure is to be used.

Correlations for aggregated weighted sensitivities or risk exposures.

|  | 3 m | 6 m | 1 yr | 2 yr | 3 yr | 5 yr | 10 yr | 15 yr | 20 yr | 30 yr |
|---|---|---|---|---|---|---|---|---|---|---|
| 3 m |  | 78.2% | 61.8% | 49.8% | 43.8% | 36.1% | 27.0% | 19.6% | 17.4% | 12.9% |
| 6 m | 78.2% |  | 84.0% | 73.9% | 66.7% | 56.9% | 44.4% | 37.5% | 34.9% | 29.6% |
| 1 yr | 61.8% | 84.0% |  | 91.7% | 85.9% | 75.7% | 62.6% | 55.5% | 52.6% | 47.1% |
| 2 yr | 49.8% | 73.9% | 91.7% |  | 97.6% | 89.5% | 74.9% | 69.0% | 66.0% | 60.2% |
| 3 yr | 43.8% | 66.7% | 85.9% | 97.6% |  | 95.8% | 83.1% | 77.9% | 74.6% | 69.0% |
| 5 yr | 36.1% | 56.9% | 75.7% | 89.5% | 95.8% |  | 92.5% | 89.3% | 85.9% | 81.2% |
| 10 yr | 27.0% | 44.4% | 62.6% | 74.9% | 83.1% | 92.5% |  | 98.0% | 96.1% | 93.1% |
| 15 yr | 19.6% | 37.5% | 55.5% | 69.0% | 77.9% | 89.3% | 98.0% |  | 98.9% | 97.0% |
| 20 yr | 17.4% | 34.9% | 52.6% | 66.0% | 74.6% | 85.9% | 96.1% | 98.9% |  | 98.8% |

For aggregated weighted sensitivities or risk exposures, the correlation between the inflation rate and any yield for the same currency is 33%. For sub-curves, the correlation $\varphi_{i,j}$ between any two sub-curves of the same currency is 98.2%. The parameter $\gamma_{bc}=27\%$ is to be used for aggregating across different currencies.

Credit Qualifying Risk

Credit Qualifying—Risk Weights

Sensitivities or risk exposures to an issuer/seniority are to be first assigned to a bucket according to the following table:

| Bucket number | Credit quality | Sector |
|---|---|---|
| 1 | Investment grade (IG) | Sovereigns including central banks |
| 2 |  | Financials including government-backed financials |
| 3 |  | Basic materials, energy, industrials |
| 4 |  | Consumer |
| 5 |  | Technology, telecommunications |
| 6 |  | Health care, utilities, local government, government-backed corporates (non-financial) |
| 7 | High yield (HY) & non-rated (NR) | Sovereigns including central banks |
| 8 |  | Financials including government backed financials |
| 9 |  | Basic materials, energy, industrials |
| 10 |  | Consumer |
| 11 |  | Technology, telecommunications |
| 12 |  | Health care, utilities, local government, government-backed corporates (non-financial) |
| Residual |  |  |

Sensitivities are distinguished depending on whether they come from (i) non-securitization positions or (ii) qualifying securitization positions.

The same risk weight is used for all vertices (1 yr, 2 yr, 3 yr, 5 yr, 10 yr), according to bucket, as set out in the following table:

| Bucket number | Risk weight |
|---|---|
| 1 | 97 |
| 2 | 110 |
| 3 | 73 |
| 4 | 65 |
| 5 | 52 |
| 6 | 39 |
| 7 | 198 |
| 8 | 638 |
| 9 | 210 |
| 10 | 375 |
| 11 | 240 |
| 12 | 152 |
| Residual | 638 |

The vega risk weight, VRW, for the Credit risk class is 0.35.

Credit Qualifying—Correlations

The correlation parameters $\rho_{kC}$ applying to sensitivity or risk exposure pairs within the same bucket are set out in the following table:

|  | Same issuer/seniority, different vertex or | Different issuer/seniority |
|---|---|---|
| Aggregate sensitivities | 98% | 55% |
| Residual bucket | 50% | 50% |

Source refers to whether the sensitivity is as a result of securitization or non-securitization, which will not be fully offset.

The correlation parameters $\gamma_{bp}$ applying to sensitivity or risk exposure pairs across different non-residual buckets is set out in the following table:

| Bucket | 1 | 2 | 3 | 4 | 5 | 6 | 7 | 8 | 9 | 10 | 11 | 12 |
|---|---|---|---|---|---|---|---|---|---|---|---|---|
| 1 |  | 51% | 47% | 49% | 46% | 47% | 41% | 36% | 45% | 47% | 47% | 43% |
| 2 | 51% |  | 52% | 52% | 49% | 52% | 37% | 41% | 51% | 50% | 51% | 46% |
| 3 | 47% | 52% |  | 54% | 51% | 55% | 37% | 37% | 51% | 49% | 50% | 47% |
| 4 | 49% | 52% | 54% |  | 53% | 56% | 36% | 37% | 52% | 51% | 51% | 46% |
| 5 | 46% | 49% | 51% | 53% |  | 54% | 35% | 35% | 49% | 48% | 50% | 44% |
| 6 | 47% | 52% | 55% | 56% | 54% |  | 37% | 37% | 52% | 49% | 51% | 48% |
| 7 | 41% | 37% | 37% | 36% | 35% | 37% |  | 29% | 36% | 34% | 36% | 36% |
| 8 | 36% | 41% | 37% | 37% | 35% | 37% | 29% |  | 37% | 36% | 37% | 33% |
| 9 | 45% | 51% | 51% | 52% | 49% | 52% | 36% | 37% |  | 49% | 50% | 46% |
| 10 | 47% | 50% | 49% | 51% | 48% | 49% | 34% | 36% | 49% |  | 49% | 46% |
| 11 | 47% | 51% | 50% | 51% | 50% | 51% | 36% | 37% | 50% | 49% |  | 46% |
| 12 | 43% | 46% | 47% | 46% | 44% | 48% | 36% | 33% | 46% | 46% | 46% |  |

Credit Non-Qualifying Risk

Credit Non-Qualifying—Risk Weights

Sensitivities or risk exposures are to be first assigned to a bucket according to the following table:

| Bucket number | Credit quality | Sector |
|---|---|---|
| 1 | Investment grade (IG) | RMBS/CMBS |
| 2 | | Credit card, student loan ABS |
| 3 | | Auto ABS |
| 4 | High yield (HY) & | RMBS/CMBS |
| 5 | non-rated (NR) | Credit card, student loan ABS |
| 6 | | Auto ABS |
| Residual | | |

If it is not possible to allocate a sensitivity or risk exposure to one of these buckets (for example, because data on categorical variables is not available), then the position is to be allocated to the "residual bucket."

The risk weights are set out in the following table:

| Bucket number | Risk Weight |
|---|---|
| 1 | 227 |
| 2 | 150 |
| 3 | 120 |
| 4 | 1955 |
| 5 | 450 |
| 6 | 400 |
| Residual | 700 |

The vega risk weight, VRW, for Credit Non-Qualifying is 0.20

Credit Non-Qualifying—Correlations

For the other buckets, the correlation parameters $\rho_{kC}$ applying to sensitivity or risk exposure pairs within the same bucket are set out in the following table:

| | Same underlying names (more than 80% overlap in notional terms) | Different underlying names (less than 80% overlap in notional terms) |
|---|---|---|
| Aggregate sensitivities | 82% | 14% |
| Residual bucket | 50% | 50% |

The correlation parameters $\gamma_{bp}$ applying to sensitivity or risk exposure pairs across different buckets is set out in the following table:

| | Correlation |
|---|---|
| Non-residual bucket to non-residual bucket | 14% |

Equity Risk

Equity—Risk Weights

Sensitivities or risk exposures are to be first assigned to a bucket according to the buckets defined in the following table:

| Bucket number | Size | Region | Sector |
|---|---|---|---|
| 1 | Large | Emerging markets | Consumer goods and services, transportation and storage, administrative and support service activities, utilities |
| 2 | | | Telecommunications, industrials |
| 3 | | | Basic materials, energy, agriculture, manufacturing, mining and |
| 4 | | | Financials including gov't-backed financials, real estate activities, technology |
| 5 | | Developed markets | Consumer goods and services, transportation and storage, administrative and support service activities, utilities |
| 6 | | | Telecommunications, industrials |
| 7 | | | Basic materials, energy, agriculture, manufacturing, mining and |
| 8 | | | Financials including gov't-backed financials, real estate activities, technology |
| 9 | Small | Emerging markets | All sectors |
| 10 | | Developed markets | All sectors |
| 11 | All | All | Indexes, Funds, ETFs |

"Large" is defined as a market capitalization equal to or greater than USD 2 billion and "small" is defined as a market capitalization of less than USD 2 billion. "Market capitalization" is defined as the sum of the market capitalizations of the same legal entity or group of legal entities across all stock markets globally. The developed markets are defined as: Canada, US, Mexico, the euro area, the non-euro area western European countries (the United Kingdom, Norway, Sweden, Denmark, and Switzerland), Japan, Oceania (Australia and New Zealand), Singapore and Hong Kong. The sectors definition is the one generally used in the market. When allocating an equity position to a particular bucket, the bank must prove that the equity issuer's most material activity indeed corresponds to the bucket's definition. Acceptable proofs might be external providers' information, or internal analysis. For multinational multi-sector equity issuers, the allocation to a particular bucket must be done according to the most material region and sector the issuer operates in. If it is not possible to allocate a position to one of these buckets (for example, because data on categorical variables is not available) then the position must be allocated to a "residual bucket." Risk weights are assigned to each notional position as in the following table:

| Bucket number | Risk weight |
|---|---|
| 1 | 22 |
| 2 | 28 |

| Bucket number | Risk weight |
| --- | --- |
| 3 | 28 |
| 4 | 25 |
| 5 | 18 |
| 6 | 20 |
| 7 | 24 |
| 8 | 23 |
| 9 | 26 |
| 10 | 27 |
| 11 | 15 |
| Residual | 28 |

The vega risk weight, VRW, for the equity risk class is 0.21.

Equity—Correlations

The correlation parameters $\rho_{kC}$ applying to sensitivity or risk exposure pairs within the same bucket are set out in the following table:

| Bucket number | Correlation |
| --- | --- |
| 1 | 14% |
| 2 | 24% |
| 3 | 25% |
| 4 | 20% |
| 5 | 26% |
| 6 | 34% |
| 7 | 33% |
| 8 | 34% |
| 9 | 21% |
| 10 | 24% |
| 11 | 63% |
| Residual | 0% |

The correlation parameters $\gamma_{bp}$ applying to sensitivity or risk exposure pairs across different non-residual buckets are set out in the following table:

| Buckets | 1 | 2 | 3 | 4 | 5 | 6 | 7 | 8 | 9 | 10 | 11 |
| --- | --- | --- | --- | --- | --- | --- | --- | --- | --- | --- | --- |
| 1 |  | 17% | 18% | 16% | 8% | 10% | 10% | 11% | 16% | 8% | 18% |
| 2 | 17% |  | 24% | 19% | 7% | 10% | 9% | 10% | 19% | 7% | 18% |
| 3 | 18% | 24% |  | 21% | 9% | 12% | 13% | 13% | 20% | 10% | 24% |
| 4 | 16% | 19% | 21% |  | 13% | 17% | 16% | 17% | 20% | 13% | 30% |
| 5 | 8% | 7% | 9% | 13% |  | 28% | 24% | 28% | 10% | 23% | 38% |
| 6 | 10% | 10% | 12% | 17% | 28% |  | 30% | 33% | 13% | 26% | 45% |
| 7 | 10% | 9% | 13% | 16% | 24% | 30% |  | 29% | 13% | 25% | 42% |
| 8 | 11% | 10% | 13% | 17% | 28% | 33% | 29% |  | 14% | 27% | 45% |
| 9 | 16% | 19% | 20% | 20% | 10% | 13% | 13% | 14% |  | 11% | 25% |
| 10 | 8% | 7% | 10% | 13% | 23% | 26% | 25% | 27% | 11% |  | 34% |
| 11 | 18% | 18% | 24% | 30% | 38% | 45% | 42% | 45% | 25% | 34% |  |

Commodity Risk

Commodity—Risk Weights

The risk weights depend on the commodity type; they are set out in the following table:

| Bucket | Commodity | Risk Weight |
| --- | --- | --- |
| 1 | Coal | 9 |
| 2 | Crude | 19 |
| 3 | Light Ends | 18 |
| 4 | Middle Distillates | 13 |
| 5 | Heavy Distillates | 24 |
| 6 | North America Natural Gas | 17 |
| 7 | European Natural Gas | 21 |
| 8 | North American Power | 35 |
| 9 | European Power | 20 |
| 10 | Freight | 50 |
| 11 | Base Metals | 21 |
| 12 | Precious Metals | 19 |
| 13 | Grains | 17 |
| 14 | Softs | 15 |
| 15 | Livestock | 8 |
| 16 | Other | 50 |

The vega risk weight, VRW, for the commodity risk class is 0.36.

Commodity—Correlations

The correlation parameters $\rho_{kC}$ applying to sensitivity or risk exposure pairs within the same bucket are set out in the following table:

| Bucket | Correlation |
| --- | --- |
| 1 | 71% |
| 2 | 92% |
| 3 | 97% |
| 4 | 97% |
| 5 | 99% |
| 6 | 98% |
| 7 | 100% |
| 8 | 69% |
| 9 | 47% |
| 10 | 1% |
| 11 | 67% |
| 12 | 70% |
| 13 | 68% |
| 14 | 22% |
| 15 | 50% |
| 16 | 0% |

The correlation parameters $\gamma_{bp}$ applying to sensitivity or risk exposure pairs across different buckets are set out in the following table:

| Bucket | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | — | 11% | 16% | 13% | 10% | 6% | 20% | 5% | 17% | 3% | 18% | 9% | 10% | 5% | 4% | 0% |
| 2 | 11% | — | 95% | 95% | 93% | 15% | 27% | 19% | 20% | 14% | 30% | 31% | 26% | 26% | 12% | 0% |
| 3 | 16% | 95% | — | 92% | 90% | 17% | 24% | 14% | 17% | 12% | 32% | 26% | 16% | 22% | 12% | 0% |
| 4 | 13% | 95% | 92% | — | 90% | 18% | 26% | 8% | 17% | 8% | 31% | 25% | 15% | 20% | 9% | 0% |
| 5 | 10% | 93% | 90% | 90% | — | 18% | 37% | 13% | 30% | 21% | 34% | 32% | 27% | 29% | 12% | 0% |
| 6 | 6% | 15% | 17% | 18% | 18% | — | 7% | 62% | 3% | 15% | 0% | 0% | 23% | 15% | 7% | 0% |
| 7 | 20% | 27% | 24% | 26% | 37% | 7% | — | 7% | 66% | 20% | 6% | 6% | 12% | 9% | 9% | 0% |
| 8 | 5% | 19% | 14% | 8% | 13% | 62% | 7% | — | 9% | 12% | -1% | 0% | 18% | 11% | 4% | 0% |
| 9 | 17% | 20% | 17% | 17% | 30% | 3% | 66% | 9% | — | 12% | 10% | 6% | 12% | 10% | 10% | 0% |
| 10 | 3% | 14% | 12% | 8% | 21% | 15% | 20% | 12% | 12% | — | 10% | 7% | 9% | 10% | 16% | 0% |
| 11 | 18% | 30% | 32% | 31% | 34% | 0% | 6% | -1% | 10% | 10% | — | 46% | 20% | 26% | 18% | 0% |
| 12 | 9% | 31% | 26% | 25% | 32% | 0% | 6% | 0% | 6% | 7% | 46% | — | 25% | 23% | 14% | 0% |
| 13 | 10% | 26% | 16% | 15% | 27% | 23% | 12% | 18% | 12% | 9% | 20% | 25% | — | 29% | 6% | 0% |
| 14 | 5% | 26% | 22% | 20% | 29% | 15% | 9% | 11% | 10% | 10% | 26% | 23% | 29% | — | 15% | 0% |
| 15 | 4% | 12% | 12% | 9% | 12% | 7% | 9% | 4% | 10% | 16% | 18% | 14% | 6% | 15% | — | 0% |
| 16 | 0% | 0% | 0% | 0% | 0% | 0% | 0% | 0% | 0% | 0% | 0% | 0% | 0% | 0% | 0% | — |

Foreign Exchange Risk

For foreign exchange—risk weights, a unique risk weight equal to 7.9 applies to all the FX sensitivities or risk exposures. The vega risk weight, VRW, for FX volatility is 0.21.

For foreign exchange—correlations, a unique correlation $\rho_{kC}$ equal to 0.5 applies to all the pairs of FX sensitivities or risk exposures.

Concentration Thresholds

The concentration thresholds for interest-rate risk are, given by currency group:

| Currency Group | Concentration threshold (USD/bp) |
|---|---|
| G10 + DKK | TBD |
| All other currencies | TBD |

The concentration thresholds for credit spread risk are, given by credit risk type:

| Credit risk type | Concentration threshold (USD/bp) |
|---|---|
| Qualifying | TBD |
| Non-Qualifying | TBD |

The concentration thresholds for equity risk are:

| Equity risk type | Concentration threshold (USD/bp) |
|---|---|
| Emerging Markets | TBD |
| Developed Markets | TBD |
| Indexes, Funds, ETFs | TBD |

The concentration thresholds for commodity risk are:

| Commodity risk type | Concentration threshold (USD/bp) |
|---|---|
| Coal, Crude, Light Ends, Middle Distillates, Heavy Distillates, NA Natural Gas, European | TBD |
| NA Power, European Power, Freight | TBD |
| Base Metals, Precious Metals, Grains, Softs, Livestock, Other | TBD |

The concentration thresholds for FX risk are:

| Commodity risk type | Concentration threshold (USD/bp) |
|---|---|
| All currencies | TBD |

The concentration thresholds for vega risk are:

| Vega risk type | Concentration threshold (USD/bp) |
|---|---|
| All buckets | TBD |

Correlation Between Risk Classes if using Product Classes

The correlation parameters $\psi_{Cr}$ applying to initial margin risk classes within a single product class are set out in the following table:

| Risk Class | Interest Rate | Credit Qualifyin | Credit Non- | Equity | Commodit | FX |
|---|---|---|---|---|---|---|
| Interest Rate | | 9% | TBD | 18% | 32% | 27% |
| Credit Qualifying | 9% | | TBD | 58% | 34% | 29% |
| Credit Non-qualifying | TBD | TBD | | TBD | TBD | TBD |
| Equity | 18% | 58% | TBD | | 26% | 31% |
| Commodity | 32% | 34% | TBD | 26% | | 37% |
| FX | 27% | 29% | TBD | 31% | 37% | |

Risk Data Standards

The following describes a way of describing risk on portfolios and trades, which may be required by both market participants as part of the reconciliation process to resolve differences in calculated SIMM values, and also for IM calculation. The proposal is for a simple, robust format, which can be read by automated processes as well as being capable of manual inspection. The format is specified for the current set of risk factors, but can also easily be extended to handle new risk factors in future. The objective is to have a format which is capable of achieving two different objectives—both risk reconciliation and the basis for IM calculation. Given risk data in this format, it is understood that the format be straightforward and mechanical to calculate the IM of a portfolio.

The format is a simple flat file, with rows separated by end-of-line markers, and columns separated by "TAB" characters (ASCII 9). Elements can be either textual, or numerical (represented as strings), and type can be context-dependent. The first row of the file is a header row which contains the name of the columns, with TAB-separation as usual. Each additional row contains a single risk factor for a trade or portfolio.

The five keys for the risk factors are as follows. RiskType—string describing the type of risk factor, such as interest-rate risk, qualifying credit risk, etc. Examples include Risk_IRCurve (interest-rate delta), Risk_Inflation (inflation delta) Risk_CreditQ (credit qualifying), Risk_CreditNonQ (credit non-qualifying), Risk_Equity (equity risk), Risk_Commodity (commodity risk), Risk_FX (FX risk), Risk_IRVol (interest-rate vega), Risk_CreditVol (credit vega), Risk_CreditVolNonQ (Credit non-qualifying vega), Risk_EquityVol (equity vega), Risk_CommodityVol (commodity vega), Risk_FXVol (FX vega). This specifies the risk category for each factor that contributes to the IM. Qualifier—string description of the particular risk factor, such as currency (interest rate), issuer (qualifying credit), etc. Bucket—numerical bucket number of the qualifier (where applicable). This corresponds to the buckets described in the SIMM methodology for credit, equity and commodity risk factors. For instance, any position in a large-size developed market equity in the "Consumer, utilities" sector would have a Bucket value of 5. Label1—tenor label describing the vertex of the risk factor, such as "3m", "5y", etc. Label2—second tenor label used if the risk factor is a matrix.

These keys may be fixed and/or immutable, but the allowed values may be flexible and can evolve over time. Any risk, whether scalar, vector or matrix shaped, can be represented with these keys. There are a further three columns to contain the amount of risk: (1) Amount—amount of the risk, in units of a given currency, which is a number, (2) AmountCurrency—currency of the "amount" field, which can be a standard three-letter ISO currency code, (3) AmountUSD—amount of the risk, expressed in USD (this has the additional benefit of implying the effective FX rate used by the data-producer to convert between the amount currency and USD). A further column which is useful for meeting important regional regulations: ProductClass—a string identifier describing which product class the trade (or portfolio of trades) belongs to, and the allowed values are "RatesFX," "credit," "equity," "commodity."

Optional other columns are permitted and encouraged. The standard allows for any other further additional columns containing trade or portfolio identifiers and so forth as may be required by any user or context. Other columns which might be useful include: PortfolioID (e.g, an optional identifier to describe which portfolio/netting-set the sensitivities belong to), TradeID (e.g., an optional identifier to describe which trade within a netting-set the sensitivities belong to), and/or CounterpartyName, CounterpartyID, NettingSetNumber, etc. (e.g., additional grouping fields could be useful as necessary when mutually agreed between users of the format).

Where dates are used in CRIF files, they may be formatted according to the ISO 8601 standard, which can be described as "YYYY-MM-DD", so that 1 Sep. 2016 would be "2016-09-01."

As described above, the five headers that are used to describe the risk factor sensitivities are as follows.

RiskType—string describing the type of risk factor: interest rate (e.g., Risk_IRCurve, Risk_Inflation, Risk_IRVol); credit qualifying (e.g., Risk_CreditQ, Risk_CreditVol); credit non-Qualifying (e.g., Risk_CreditNonQ, Risk_CreditVolNonQ); Equity (e.g., Risk_Equity, Risk_EquityVol); foreign exchange (FX) (e.g., Risk_FX, Risk_FXVol); and commodity (e.g., Risk_Commodity, Risk_CommodityVol).

Qualifier: all interest rate types (the ISO currency name, e.g., USD, EUR, SEK). All credit qualifying types (e.g, ISIN). This is a representative ISIN for the issuer/seniority combination. All credit non-qualifying types. All equity types (e.g., ISIN for all equities, except for indexes, funds and ETFs which have a user-defined string description). Risk_FX (e.g., non-base currency for delta, "EUR" or "CHF", etc. for delta. Risk_FXVol (e.g., currency pair for vega, "EURJPY" or "SEKCHF" for vega). Commodity (e.g., String description of the commodity).

Bucket: Risk_IRCurve: Integer code. A value of 1 (meaning Bucket #1) corresponds to regular vol currencies, a value of 2 corresponds to low-volatility currencies, and 3 corresponds to high-volatility currencies. If other categories of currencies are introduced, they will be given subsequent integer codes. Risk_Inflation, Risk_IRVol: unused. All credit qualifying types: integer code from 1-12 or the string "residual," corresponding to the SIMM buckets for qualifying credit. Bucket values run from 1 (IG Sovereigns) to 12 (HY Parastatals) plus "residual." All credit mon-qualifying types: integer code from 1-6 or the string "residual", corresponding to the SIMM buckets for non-qualifying credit. Bucket values run from 1 (IG RMBS/CMBS) to 6 (HY Auto ABS) plus "residual." All equity types: Integer code from 1-11 or the string "residual", corresponding to the SIMM buckets for equity. Bucket values run from 1 (large emerging-markets "consumer, utilities") to 11 (Indexes, Funds, ETFs) plus "residual." All commodity types: integer code from 1-16, corresponding to the SIMM buckets for commodity. Bucket values run from 1 (Coal) to 16 (Other).

Label1. Risk_IRCurve and Risk_IRVol: The risk tenor T, for T in ["3m", "6m", "1y", "2y", "3y", "5y", "10y", "15y", "20y", "30y"]. All credit types: the risk tenor T, for T in ["1y", "2y", "3y", "5y", "10y"]. Risk_EquityVol, Risk_FXVol, Risk_CommodityVol: The vol-tenor (option expiry) T, for T in ["3m", "6m", "1y", "2y", "3y", "5y", "10y", "15y", "20y", "30y"].

Label2. Risk_IRCurve: The subcurve name. Can be "OIS", "Libor1m", "Libor3m", "Libor6m", "Libor12m", or (for USD only) "Prime." Risk_CreditQ: the string "Sec" if the risk arises from a qualifying securitization. Also useful for future expansion, such as vega becoming a fully two-dimensional risk.

These first five keys are to be fixed, but the allowed values are flexible and can evolve over time. The other three fields (Amount, AmountCurrency, AmountUSD) have fixed names, but their content is variable and are the numbers used for reconciliation of risk factor sensitivities. The first five keys define a five-tuple, which may give a precise description of any risk. It is to be understood for the file to contain more than one instance of the same five-tuple. For instance, if the file is listing risk broken out by TradeID, then the five-tuple ("Risk_IRCurve", "USD", 1, "5y", " "), which means 5y USD Interest Rate Delta may occur several times in the file, if there are several USD trades in the portfolio.

For interest-rate risk, the five keys and the amount value are used in the following way:

| Label | Value |
|---|---|
| RiskType | "Risk_IRCurve" |
| Qualifier | Currency of curve, such as "USD", "EUR", etc. Use standard ISO codes. |

-continued

| Label | Value |
|---|---|
| Bucket | Integer which can be:<br>1 (Regular), 2 (Low volatility), or 3 (High volatility) |
| Label1 | Tenor: "3m", "6m", "1y", "2y", "3y", "5y",<br>"10y", "15y", "20y", or "30y" |
| Label2 | Sub curve name. Can be "OIS", "Libor1m", "Libor3m",<br>"Libor6m", "Libor12m", or (for USD only) "Prime". |
| Amount | Sensitivity value in base currency units, quoted per 1 bp<br>increase in par market spot rate<br>(Cash rates for "3m" and "6m", swap rates for "1y" and<br>longer). Show risk separately for swap rates against different<br>references, eg Libor3m or Libor6m or OIS. Intra-currency<br>spread risk, for example 3m/6m, can be converted into a<br>combination of outright Libor3m and Libor6m risks.<br>Cross-currency basis swap risk can be ignored.<br>Where the source system risk needs to be rebucketed onto the<br>standard SIMM tenors, this can be done with linear allocation.<br>For example, sensitivity to the 7 y tenor may be<br>allocated 60% to 5 y and 40% to<br>10 y (100% × 7 y = 60% × 5 y + 40% × 10 y). Risk below<br>3 m or beyond 30 y may be allocated using flat extrapolation.<br>Valuation may also be sensitive to choice of discounting,<br>according to how trades are collateralized.<br>The recommended best practice is for IR delta to include the<br>risk of collateral funding adjustments. For example,<br>a USD swap trade collateralized in EUR may<br>show some risk to the EUR curve. It is acknowledged that<br>this may be difficult for some market participants,<br>so it is permitted to use the unadjusted delta.<br>When computing deltas for instruments subject to optionality,<br>participants can assume that<br>delta is calculated keeping constant the relevant standard<br>volatility and skew for the market concerned, which might<br>be log-normal or normal volatility, sticky strike or<br>sticky delta, etc. |

For inflation, the values for the six labels have the following values:

| Label | Value |
|---|---|
| RiskType | "Risk_Inflation" |
| Qualifier | Currency of inflation curve, such as "USD", "EUR", etc |
| Bucket | Unused, blank |
| Label1 | Unused, blank |
| Label2 | Unused, blank |
| Amount | Sensitivity value in base currency units, quoted per 1 bp<br>parallel increase in inflation zero coupon swap market rates.<br>Add up over different inflation indexes in the same currency. |

For qualifying credit risk, the six labels take these values:

| Label | Value |
|---|---|
| RiskType | "Risk_CreditQ" |
| Qualifier | ISIN code of a representative security of the given issuer<br>for the given seniority. Must be a string of the form "ISIN:"<br>plus the 12-character ISIN string, such as<br>"ISIN:XS1081333921". |
| Bucket | Integer between 1 and 12, or the string "Residual" |
| Label1 | Tenor "1y", "2y", "3y", "5y", or "10y" |
| Label2 | Set to the string "Sec" if the risk arises<br>from a qualifying securitization |
| Amount | Sensitivity value in base currency units, quoted per 1 bp<br>increase in par credit default swap spread (standard spreads<br>preferred, but natural spreads acceptable). Add up over all<br>credit spread curves for the issuer, which may differ by<br>seniority, documentation (such as restructuring clause),<br>or currency. Index or bespoke basket delta may be allocated<br>back to the individual single names. |

For non-qualifying credit risk, the six labels take these values:

| Label | Value |
|---|---|
| RiskType | "Risk_CreditNonQ" |
| Qualifier | TO BE DETERMINED BY DATA SOURCES GROUP |
| Bucket | Integer between 1 and 6 or the string "Residual" |
| Label1 | Tenor "1y", "2y", "3y", "5y", or "10y" |
| Label2 | Unused, blank |
| Amount | Sensitivity value in base currency units, quoted per 1 bp<br>increase in par credit default swap spread (standard spreads<br>preferred, but natural spreads acceptable). Add up over all<br>credit spread curves for the tranche if applicable.<br>Risk to non-qualifying tranches is not<br>decomposed to single name risk. |

For equity risk, the six labels take these values:

| Label | Value |
|---|---|
| RiskType | "Risk_ Equity" |
| Qualifier | ISIN for single-stock equities, must be of the<br>form "ISIN:GB0001383545". May be a user-defined<br>string description for bucket 11 (Indexes, Funds, ETFs). |
| Bucket | Integer between 1 and 11 or the string "Residual". |
| Label1 | Unused, blank |
| Label2 | Unused, blank |
| Amount | Sensitivity value in base currency units,<br>quoted per 1% increase in spot equity price.<br>Can be added up for the same equity over<br>different trading venues.<br>Dividend risk is not included.<br>Index/Fund/ETF delta may not be allocated back<br>to single names, but kept intact and<br>put into bucket 11 (Indexes, Funds, ETFs).<br>Delta risk to bespoke baskets (not indexes)<br>may be allocated back to their constituents. |

For commodity risk, the six labels take these values:

| Label | Value |
|---|---|
| RiskType | "Risk_ Commodity" |
| Qualifier | String description of the commodity<br>(see Appendix 1 for details) |
| Bucket | Integer between 1 and 16 |
| Label1 | Unused, blank |
| Label2 | Unused, blank |
| Amount | Sensitivity value in base currency units,<br>quoted per 1% increase in commodity price. May<br>be added up along the forward curve - assuming<br>a "parallel" shock of 1% increase in all<br>forward prices. Index delta can either (standard<br>approach) be put into bucket 16 (Other), or<br>alternatively (advanced approach) be allocated<br>back to the individual single names. Bespoke<br>basket delta is allocated back to the individual<br>commodity names. |

For foreign exchange risk, the six labels take these values:

| Label | Value |
|---|---|
| RiskType | "Risk_FX" |
| Qualifier | Currency of the FX position, eg "EUR", "CHF", etc. Can be equal to the base currency. |
| Bucket | Unused, blank |
| Label1 | Unused, blank |
| Label2 | Unused, blank |
| Amount | Sensitivity value in base currency units, quoted per 1% increase in worth of the currency given in Qualifier. Needs to be quoted for the base currency as well. There are two equivalent definitions for the base currency FX risk. Either: (a) sensitivity of the portfolio's value, when quoted in an alternative base currency, to a 1% increase in worth of the original base currency (with that sensitivity converted back into base currency units), or (b) one percent of the total PV of the trade's value in base currency, less the sum of the other FX risks. The total sum of all FX risks may be one percent of the total PV of the portfolio/trade. See examples for more details. |

There are different vega types for each asset type. The options available are described in the following table:

| RiskType | Qualifier | Bucket | Label1 | Label2 | Amount |
|---|---|---|---|---|---|
| Risk_IRVol | Currency | Unused | Option expiry tenor, as for Risk_IRCurve | Unused | (Vega × Volatility), in base currency units |
| Risk_CreditVol | As per Risk_CreditQ. Indexes TBD | As for Risk_Credit (use "Residual" for cross-sector indexes) | Option expiry tenor, as for Risk_CreditQ | Unused | (Vega × Volatility), in base currency units |
| Risk_EquityVol | As per Risk_Equity | As for Risk_Equity | Option expiry tenor, as for Risk_IRCurve | Unused | Log-normal Vega in base currency units |
| Risk_CommodityVol | As per Risk_Commodity | As for Risk_Commodity (use 16 for indexes) | Option expiry tenor, as for Risk_IRCurve | Unused | Log-normal Vega in base currency units |
| Risk_FXVol | Currency pair, such as "EURUSD", "USDJPY". Can be in either order. | Unused | Option expiry tenor, as for Risk_IRCurve | Unused | Log-normal Vega in base currency units |

For interest rates and credit the amount is equal to the product of the vega and the volatility, which is then added up over the underlying swap maturities, so that the reported vega is a column of numbers which are equal to the sums along each row of the matrix (over all underlying swap tenors). For equity, commodity, and FX, the reported vega is a column of numbers, being the log-normal volatility for each expiry in the set "3m" "6m" "1y", "2y" "3y" "5y" "10y" "15y" "20y" or "30y."

For indexes and baskets, please note the following special cases. Credit (qualifying): vega to credit indexes may not be allocated back to single-name volatility risk, but may be put completely into the relevant bucket, or "residual" bucket for cross-sectoral indexes. Equity index: vega to equity indexes/funds/ETFs may not be allocated back to index constituents, but may be put completely into bucket 11 ("Indexes, Funds, ETFs"). Equity bespoke basket: vega to equity bespoke baskets may be allocated back to the basket constituents, and those vegas put into the relevant buckets. Commodity index: vega to commodity indexes may not be allocated back to index constituents, but may be put completely into the relevant bucket, or bucket 16 ("other") for cross-sectoral indexes.

The following are descriptions of various examples in accordance with one or more aspects of the disclosure.

Interest-rate swap: 5y USD Interest rate par swap, we receive fixed on USD 10 million. The risk is −4,881 USD per 1 bp increase in the 5y par swap rate, so the file contents would be:

| ProductClass | RiskType | Qualifier | Bucket | Label1 | Label2 | Amount |
|---|---|---|---|---|---|---|
| RatesFX | Risk_IRCurve | USD | 1 | 5 y | | −4,881 |

Inflation swap: 7y USD CPI inflation zero coupon swap, we receive fixed on USD 10 million. The 7y inflation risk is −6,968, which is allocated to inflation risk in its entirety since SIMM uses a flat inflation rate for each currency as a risk factor. The relevant lines of the file would show:

| ProductClass | RiskType | Qualifier | Bucket | Label1 | Label2 | Amount |
|---|---|---|---|---|---|---|
| RatesFX | Risk_Inflation | USD | | | | −6,968 |

Credit default swap: 5y CDS on General Electric Co., we buy protection on USD 10 million. The CDS risk is 4,939 USD per 1 bp increase in the standard CDS spread. The file has:

| ProductClass | RiskType | Qualifier | Bucket | Label1 | Label2 | Amount |
|---|---|---|---|---|---|---|
| Credit | Risk_CreditQ | ISIN: XS1081333921 | 3 | 5 y | | 4,939 |

Equity option: 1y at-the-money call option on FTSE100 index, on GBP 10 million notional (1526.655 units of index). The equity spot price is 6,550.27, and the equity delta is equivalent to 854.161 units of index (56% delta), which in GBP cash terms is GBP 5,594,785. Thus a 1% increase in the equity price would be worth GBP 55,948. Given a GBP/USD fx rate of 1.5103, gives a USD equity risk of USD 84,498. The equity vega is GBP 39,448 for a 1% increase in ATM log-normal volatility, which is simply converted into the reporting currency as USD 59,578.

| ProductClass | RiskType | Qualifier | Bucket | Label1 | Label2 | Amount |
|---|---|---|---|---|---|---|
| Equity | Risk_Equity | FTSE100 | 11 | | | 84,498 |
| Equity | Risk_EquityVol | FTSE100 | 11 | 1 y | | 59,578 |

Commodity option: 3m call option on Gold, on 10,000 oz notional, strike 1185 USD/oz. The Gold spot price is 1187, and the option delta is USD 5,571 per unit increase in the gold price (also described as a delta of 5,571 oz). Thus a 1% increase in the gold price would be worth USD 66,124. The vega is USD 23,754 for a 1% increase in the ATM Black-Scholes volatility, which does not need further processing.

| ProductClass | RiskType | Qualifier | Bucket | Label1 | Label2 | Amount |
|---|---|---|---|---|---|---|
| Commodity | Risk_Commodity | Precious Metals Gold | 12 | | | 66,124 |
| Commodity | Risk_CommodityVol | Precious Metals Gold | 12 | 3 m | | 23,754 |

FX forward #1: off market 1y FX forward, where we receive USD 10 million, and pay EUR 8 million. The EUR/USD FX (today) rate is 1.149575. The PV of this position is USD 744,484, with a EUR/USD FX delta of EUR −8,030,825 (equivalent to a USD delta of USD +9,232,035). Some firms may employ the concept of "component PV" or "equivalent position". Given an FX delta to a certain currency, the component PV is the amount of cash in that currency that has the same FX delta. In this example, the EUR component PV is EUR −8,030,825, and the USD component PV is USD 9,976,518 (which is the sum of the total PV plus the USD delta). The file contents would be:

| ProductClass | RiskType | Qualifier | Bucket | Label1 | Label2 | Amount |
|---|---|---|---|---|---|---|
| RatesFX | Risk_FX | EUR | | | | −92,320 |
| RatesFX | Risk_FX | USD | | | | 99,765 |

FX forward #2: off market 1y FX forward, where we receive GBP 10 million, and pay EUR 12 million. The GBP/USD today FX rate is 1.510296. The PV of this position is USD 1,190,303. There are two deltas: EUR/USD Delta=EUR −12,046,237 (equivalent to a USD delta of USD +13,848,052), and GBP/USD Delta=GBP+9,957,220 (equivalent to a USD delta of USD −15,038,354). For comparison, the component PVs are EUR −12,046,237 and GBP +9,957,220. The file contents in this case are:

| ProductClass | RiskType | Qualifier | Bucket | Label1 | Label2 | Amount |
|---|---|---|---|---|---|---|
| RatesFX | Risk_FX | EUR | | | | −138,481 |
| RatesFX | Risk_FX | GBP | | | | 150,384 |
| RatesFX | Risk_FX | USD | | | | 0 |

In this case, the total USD delta is zero (so it does not need to be included in the file). Moreover, the sum of all the deltas is equal to 11,903, which again is one percent of the total PV.

Interest rate vega example: bermudan swaption 2% coupon, 10y no call 2y, our option to stop paying fixed. A simple example vega matrix for this trade is in terms of normal volatility risk (USD per 1 bp/year normal vol):

|      | 6 M | 1 Y | 2 Y | 3 Y | 4 Y | 5 Y | 6 Y | 7 Y | 8 Y | 9 Y |
|------|-----|-----|-----|-----|-----|-----|-----|-----|-----|-----|
| 18 M | 0   | 0   | 0   | 0   | 0   | 0   | 0   | 0   | 18  | 18  |
| 21 M | 0   | 0   | 0   | 0   | 0   | 0   | 0   | 0   | 0   | 0   |
| 2 Y  | 0   | 0   | 0   | 0   | 0   | 0   | 0   | 172 | 885 | 0   |
| 3 Y  | 0   | 0   | 0   | 0   | 0   | 0   | 166 | 342 | 179 | 0   |
| 4 Y  | 0   | 0   | 0   | 0   | 0   | 125 | 689 | 171 | 0   | 0   |
| 5 Y  | 0   | 0   | 0   | 0   | 121 | 249 | 130 | 0   | 0   | 0   |
| 6 Y  | 0   | 0   | 0   | 91  | 491 | 122 | 0   | 0   | 0   | 0   |
| 7 Y  | 0   | 0   | 84  | 174 | 90  | 0   | 0   | 0   | 0   | 0   |
| 8 Y  | 0   | 58  | 339 | 86  | 0   | 0   | 0   | 0   | 0   | 0   |
| 9 Y  | 88  | 59  | 60  | 0   | 0   | 0   | 0   | 0   | 0   | 0   |

The meaning of this table is that the swaption expiries are in the vertical axis on the left-hand side, and the maturities of the underlying swap are in the horizontal axis along the top. For instance, the 2y×8y point (with vega of USD 885) corresponds to an option, which expires in 2 years, on an 8 year swap. This vega matrix is the raw input from the example firm's risk management system, and the row and column tenor labels do not yet match the SIMM standards. The actual normal volatility levels (in bp/year) are:

|      | 6 M   | 1 Y   | 2 Y  | 3 Y  | 4 Y  | 5 Y  | 6 Y  | 7 Y  | 8 Y  | 9 Y  |
|------|-------|-------|------|------|------|------|------|------|------|------|
| 18 M | 74.1  | 79.5  | 85.8 | 89.6 | 90.2 | 91.2 | 91.0 | 90.5 | 90.1 | 89.6 |
| 21 M | 76.9  | 84.3  | 88.6 | 90.9 | 91.5 | 91.8 | 91.5 | 91.0 | 90.5 | 90.0 |
| 2 Y  | 78.9  | 88.1  | 90.7 | 91.7 | 92.1 | 91.9 | 91.5 | 91.0 | 90.5 | 90.0 |
| 3 Y  | 102.0 | 97.2  | 95.8 | 94.8 | 93.9 | 92.9 | 92.3 | 91.7 | 91.1 | 90.6 |
| 4 Y  | 103.8 | 99.2  | 96.4 | 95.1 | 94.1 | 93.2 | 92.4 | 91.7 | 91.0 | 90.3 |
| 5 Y  | 102.3 | 100.1 | 96.2 | 94.9 | 93.9 | 93.0 | 92.2 | 91.4 | 90.6 | 89.8 |
| 6 Y  | 101.0 | 99.2  | 95.8 | 94.2 | 92.9 | 91.6 | 90.7 | 89.8 | 88.9 | 88.1 |
| 7 Y  | 100.2 | 98.1  | 95.2 | 93.3 | 91.6 | 90.0 | 89.0 | 88.1 | 87.1 | 86.2 |
| 8 Y  | 97.6  | 96.0  | 93.3 | 91.4 | 89.6 | 87.9 | 86.9 | 85.9 | 85.0 | 84.0 |
| 9 Y  | 95.3  | 93.8  | 91.2 | 89.3 | 87.4 | 85.7 | 84.7 | 83.7 | 82.8 | 81.8 |

The vegas is multiplied by the volatilities and add up along each row to get a single column of vega:

| 18 M | 3,281  |
|------|--------|
| 21 M | 0      |
| 2 Y  | 95,780 |
| 3 Y  | 62,993 |
| 4 Y  | 91,016 |
| 5 Y  | 46,512 |
| 6 Y  | 65,359 |
| 7 Y  | 32,481 |
| 8 Y  | 44,996 |
| 9 Y  | 19,355 |
| 10 Y | 8,385  |

This is then re-gridded onto the SIMM standard tenor labels for interest-rates:

| 3 m  | 0       |
|------|---------|
| 6 m  | 0       |
| 1 y  | 1,640   |
| 2 y  | 97,420  |
| 3 y  | 108,502 |
| 5 y  | 185,665 |
| 10 y | 76,930  |
| 15 y | 0       |
| 20 y | 0       |
| 30 y | 0       |

The file contents for this risk would be:

| ProductClass | RiskType   | Qualifier | Bucket | Label1 | Label2 | Amount  |
|--------------|------------|-----------|--------|--------|--------|---------|
| RatesFX      | Risk_IRVol | USD       |        | 1 y    |        | 1,640   |
| RatesFX      | Risk_IRVol | USD       |        | 2 y    |        | 97,420  |
| RatesFX      | Risk_IRVol | USD       |        | 3 y    |        | 108,502 |

-continued

| ProductClass | RiskType   | Qualifier | Bucket | Label1 | Label2 | Amount  |
|--------------|------------|-----------|--------|--------|--------|---------|
| RatesFX      | Risk_IRVol | USD       |        | 5 y    |        | 185,665 |
| RatesFX      | Risk_IRVol | USD       |        | 10 y   |        | 76,930  |

FX vega example: FX Option, 3m call on USD/JPY, call USD 10 million, struck at 117.484. The USD/JPY FX 3m vega is WY 2,325,092 (USD 19,768) for a 1% increase in log-normal volatility. The file rows for this position is:

| ProductClass | RiskType   | Qualifier | Bucket | Label1 | Label2 | Amount |
|--------------|------------|-----------|--------|--------|--------|--------|
| RatesFX      | Risk_FXVol | USDJPY    |        | 3 m    |        | 19,768 |

Risk can be aggregated (added up) where it has the same keys, including any trade identifier keys (where present). Any row which represents a zero risk can be dropped from the file. Otherwise rows are simply stacked one on top of another. For example, suppose we had a portfolio of all the example trades above, then the total file would look like:

| Product Class | RiskType | Qualifier | Bucket | Label1 | Label2 | Amount | Amount Currency | Amount USD |
|---|---|---|---|---|---|---|---|---|
| RatesFX | Risk_IRCurve | USD | 1 | 5 y | | −4,881 | USD | −4,881 |
| RatesFX | Risk_Inflation | USD | | | | −6,968 | USD | −6,968 |
| Credit | Risk_CreditQ | ISIN: XS1081 333921 | 3 | 5 y | | 4,939 | USD | 4,939 |
| Equity | Risk_Equity | FTSE100 | 11 | | | 84,498 | USD | 84,498 |
| Equity | Risk_EquityVol | FTSE100 | 11 | 1 y | | 59,578 | USD | 59,578 |
| Commodity | Risk_Commodity | Precious Metals Gold | 12 | | | 66,124 | USD | 66,124 |
| Commodity | Risk_CommodityVol | Precious Metals Gold | 12 | 3 m | | 23,754 | USD | 23,754 |
| RatesFX | Risk_FX | EUR | | | | −230,801 | USD | −230,801 |
| RatesFX | Risk_FX | USD | | | | 80,417 | USD | 99,765 |
| RatesFX | Risk_FX | GBP | | | | 150,384 | USD | 150,384 |
| RatesFX | Risk_IRVol | USD | | 1 y | | 1,640 | USD | 1,640 |
| RatesFX | Risk_IRVol | USD | | 2 y | | 97,420 | USD | 97,420 |
| RatesFX | Risk_IRVol | USD | | 3 y | | 108,502 | USD | 108,502 |
| RatesFX | Risk_IRVol | USD | | 5 y | | 185,665 | USD | 185,665 |
| RatesFX | Risk_IRVol | USD | | 10 y | | 76,930 | USD | 76,930 |
| RatesFX | Risk_FXVol | USDJPY | | 3 m | | 19,768 | USD | 19,768 |

The data in this format may have several desirable features. For example, straightforward basis for comparison of risks between participants; data is prepared for SIMM calculation itself; the "amount" column corresponds exactly to the net sensitivities of the SIMM rules; it only remains to multiply by the respective risk weight and apply the variance-covariance formulas; and provides both a cross-check of and the ability to crowd source the link between qualifier and bucket.

The following table lists standardized commodity names to be used as the qualifier for commodity price and volatility risk. Risk from different sources to the same commodity name can be netted:

| Commodity Name | Example Contract | Bucket |
|---|---|---|
| Coal Americas | Powder River Basin Coal (Platts) Futures | 1 |
| Coal Europe | NYMEX Coal (API2) CIF ARA (ARGUS-McCloskey) | 1 |
| Coal Africa | NYMEX Coal (API4) FOB Richards Bay (ARGUS-McCloskey) Futures | 1 |
| Coal Australia | NYMEX Coal (API5) FOB Newcastle (Argus/McCloskey) | 1 |
| Crude oil Americas | Light Sweet Crude Oil (WTI) | 2 |
| Crude oil Europe | Brent Crude Oil | 2 |
| Crude oil Asia/Middle East | DME Oman Crude Futures Contract (OQD) | 2 |
| Light Ends Americas | RBOB Gasoline Physical Futures | 3 |
| Light Ends Eurorpe | Premium Unleaded Gasoline 10 ppm FOB Rotterdam Barges (Platts) Futures | 3 |
| Light Ends Asia | Singapore Mogas 92 Unleaded (Platts) Future (SMT) | 3 |
| Middle Distillates Americas | NY Harbor ULSD Futures | 4 |
| Middle Distillates Europe | Low Sulphur Gasoil Futures | 4 |
| Middle Distillates Asia | Singapore Gasoil Futures (SWS) | 4 |
| Heavy Distillates Americas | Gulf Coast No. 6 Fuel Oil 3.0% (Platts) Futures | 5 |
| Heavy Distillates Europe | Fuel Oil 3.5% FOB Rotterdam Barges Future (BAR) | 5 |
| Heavy Distillates Asia | Fuel Oil 180 CST Singapore Future (SZS) | 5 |
| NA Natural Gas Gulf Coast | NYMEX Henry Hub Natural Gas Futures | 6 |
| NA Natural Gas North East | TETCOM3 Natural Gas Forward | 6 |
| NA Natural Gas West | SoCal Natural Gas Forward | 6 |
| EU Natural Gas Europe | ICE UK Natural Gas Futures | 7 |
| NA Power Eastern Interconnect | PJM West On-Peak monthly forward | 8 |
| NA Power ERCOT | ERCOT West Zone Forward | 8 |
| NA Power Western Interconnect | SP15 On-Peak Forward | 8 |
| EU Power Germany | German Power Peakload monthly forward | 9 |
| EU Power UK | UK Baseload Power Futures | 9 |
| Freight Wet | BE Worldscale Clean Tanker FFA Route TC2 | 10 |
| Freight Dry | BE Dry Capesize FFA Route C3 | 10 |
| Base Metals Aluminium | LME Aluminium Futures | 11 |
| Base Metals Copper | LME Copper Futures | 11 |
| Base Metals Lead | LME Lead Futures | 11 |
| Base Metals Nickel | LME Nickel Futures | 11 |
| Base Metals Tin | LME Tin Futures | 11 |
| Base Metals Zinc | LME Zinc Futures | 11 |
| Precious Metals Gold | COMEX Gold Futures | 12 |
| Precious Metals Silver | COMEX Silver Futures | 12 |
| Precious Metals Palladium | NYMEX Palladium Futures | 12 |
| Precious Metals Platinum | NYMEX Platinum Futures | 12 |
| Grains Corn | CBOT Corn Future | 13 |
| Grains Soybeans | CBOT Soybean Future | 13 |

| Commodity Name | Example Contract | Bucket |
| --- | --- | --- |
| Grains Wheat | CBOT Chicago SRW Wheat Future | 13 |
| Softs Cocoa | ICE Cocoa Futures | 14 |
| Softs Coffee | ICE Coffee Futures | 14 |
| Softs Cotton | ICE Cotton Futures | 14 |
| Softs Sugar | ICE Sugar No 11 Futures | 14 |
| Livestock Live Cattle | CBOT Live Cattle Futures | 15 |
| Livestock Feeder Cattle | CBOT Feeder Cattle Futures | 15 |
| Livestock Lean Hogs | CBOT Lean Hog Futures | 15 |

In some circumstances it may be helpful to change the base currency of the CRIF file. This may be useful to compare two CRIF files for the same portfolio which have been calculated using different base currencies. To convert from one base currency to another is straightforward. All that is needed is to multiply the number in the amount column by the FX rate between the two base currencies. For example, to convert the risk file above from USD to WY, we would just multiply all the values in the "amount" column by the USDJPY FX rate, and change the "amount currency" column values from "USD" to "WY."

Figure 2:
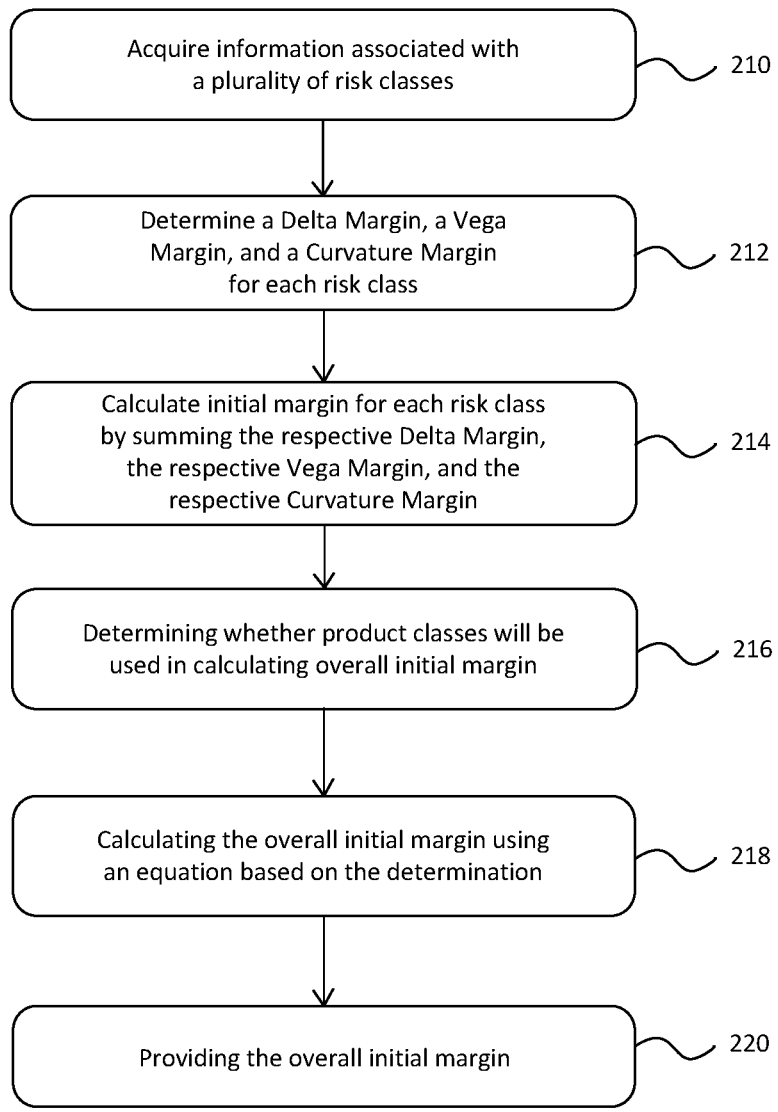
FIG. 2 illustrates an example flow diagram in accordance with one or more aspects of the invention.

FIG. 2 illustrates an example flow diagram in accordance with one or more aspects of the disclosure.

At block 210, one or more computing devices, such as the computers illustrated in system 100 of FIG. 1, may acquire information associated with a plurality of risk classes. As described above, the risk classes may be interest rate, credit-qualifying, credit-non-qualifying, equity, commodity, and foreign exchange (FX). The information, for instance, may include risk factors and sensitivity values.

The one or more computing devices determines, at block 212, a Delta Margin, a Vega Margin, and a Curvature Margin for each risk class using the equations described above. At block 214, the initial margin for each risk class is calculated by summing the respective Delta Margin, the respective Vega Margin, and the respective Curvature Margin determined at block 212.

At block 216, the one or more computing devices, determines whether product classes will be used in calculating the overall initial margin (e.g., the SIMM margin). Based on the determination, the overall initial margin is calculated using a particular equation. The equation, for instance, may be different based on whether the product classes are used or not. At block 220, the overall initial margin is provided, for example, on a display device of the one or more computing devices.

Finally, the initial margin amount, calculated through the use of the SIMM, may serve as the basis for the minimum margin amount required by the applicable regulation (under the provision for the use of internal models) for over-the-counter non-cleared derivative portfolios of covered entities. As such, the amount of the initial margin call for the underlying derivatives contract is generated based on the calculated initial margin.

SIMM Crowdsourcing Utility and Operation

Various aspects and examples associated with the crowdsourcing utility are described below. As will be further described below, "Utility" or "the Utility" or any variations thereof, may be considered to be, for example, the back-end server-side system that implements software and/or program instructions to facilitate and maintain the crowdsourcing functionalities (receive and organize data) of the SIMM and also determine the appropriate mappings to various risk buckets based on votes submitted by the SIMM users.

As described above, each asset class may contain risk buckets that are used to classify one or more risk factor sensitivities to be input into the SIMM. FIG. 3A is an example table illustrating "credit qualifying" SIMM risk buckets in accordance with one or more aspects of the invention. FIG. 3B is an example table illustrating "credit non-qualifying" SIMM risk buckets in accordance with one or more aspects of the invention. Moreover, FIG. 3C is an example table illustrating "equities" SIMM risk buckets in accordance with one or more aspects of the invention. As illustrated, each of the examples tables shown in FIGS. 3A-C show a "bucket number" column, a "credit quality" column, and a "sector" column.

It is understood that any party subject to the uncleared margin requirements is eligible to participate in crowdsourcing. In one embodiment, the users, parties utilizing the SIMM may submit data only for positions on their books that are in scope for uncleared margin requirements.

By way of example, for each underlying asset, each submitting firm can provide one identifier with a corresponding SIMM bucket as shown in FIGS. 3A-C to the Utility. This is to be considered to be one "vote." For instance, each submitting firm may apply its own internal logic and/or criteria to determine the vote to be submitted to the Utility. For example, current credit ratings can be used.

The frequency of the submission of votes to the Utility may vary, e.g., daily, weekly, bi-weekly, etc. However, in one example, submissions are made at least monthly. Thus, in this example, the votes submitted to the crowdsourcing Utility will "expire" after one month to ensure data is current, and to dynamically "manage out" votes from firms that no longer hold a position.

A new vote from a firm may, for instance, override the firm's previous vote for a specific asset underlier. In this regard, previously submitted votes for specific asset underliers may remain valid until they are overridden (or, in the above example, upon their monthly expiration).

The firms submitting votes may decide to supplement their vote with "optional" information. As an example, the optional information may include information, such as sector, region, etc. in order to ease the reconciliation process. This may be dependent on a firm's data licensing with its data vendors.

If new firms come into scope for uncleared margin requirements, the Utility may be configured to accommodate the new users to submit their votes for crowdsourcing.

In some instances, the Utility may need to perform certain checks on incoming data to ensure the integrity of the data.

Various aspects and examples associated with data submission to the Utility are described below. For example, data submission may include asset identifiers and asset class scope.

In examples related to credit qualifying assets, and further in the context of single names, an International Securities Identification Number ("ISIN") may be used to identify an underlier asset. For example, SIMM users may submit one ISIN for each underlier and seniority pairing and a corresponding relevant SIMM bucket in FIG. 3A. By way of example, FIG. 4A is a submission example from a template. As shown in FIG. 4A, the submission example includes three columns: "Red Preferred ISIN/ISIN," "Select ISDA SIMM Bucket," and "Name of issuer/underlying," which further includes entry "XS0741962681," "CRQ 2," and "ABN AMRO Bank N. V.," respectively.

Since there may be multiple ISINs for each issuer/seniority pairing, users may provide the ISIN designated by Markit® as the RED Preferred ISIN, if known and available, including for Standard Reference Obligation (SRO) trades. If a RED Preferred ISIN is not known or available, then the ISIN agreed or confirmed on the trade(s) may be submitted. (For instance, Markit® has confirmed that the SRO ISIN is the RED preferred ISIN associated with each SRO trade).

In examples related to credit qualifying assets, and further in the context of indices, credit qualifying indices may be decomposed into constituents, each constituent being mapped to a SIMM bucket following a similar methodology for single names.

In this example, a known list of reference entities which have no ISINs may exist. In that regard, for purposes of the SIMM Crowdsourcing Utility, a set of static Dummy ISINs may be provided for purposes of submission. FIG. 4B illustrates an example table of dummy ISINs. For example, the table includes a first column that recites "List of Reference Entity Long Names with No ISINs" and a second column that recites "ISDA SIMM Dummy ISINs."

In examples related to credit non-qualifying assets, and further in the context of single names, users may, for instance, submit one ISIN for each underlier and a corresponding relevant SIMM bucket in FIG. 3B. By way of example only, FIG. 5A is a submission example from a template. As shown in FIG. 5A, the submission example includes three columns: "Red Preferred ISIN/ISIN," "Select ISDA SIMM Bucket," and "Name of issuer/underlying," which further includes entry "XS0259419400," "Credit Non Q 1," and "Residential Mortgage Security," respectively In some examples related to credit non-qualifying assets, and further in the context of indices, there may not be any ISINs for credit non-qualifying indices (e.g. ABX/CMBX/ TRS on Interest Only ("IO") and TRS on Principal Only ("PO")). In this regard, the Utility may host, maintain, and/or publish a standard best practice mapping table which maps specific credit non-qualifying indices to appropriate ISDA SIMM risk buckets as agreed, in order to minimize discrepancies in risk buckets between firms. As such, the mapping table may be maintained at the index level by the Utility. Thus, the Utility may make the sources of input for the table, as well as the rules for maintenance of the table, transparent to users of the SIMM. For example, FIG. 5B illustrates an example mapping table maintained at the index level by the Utility. As shown, the mapping table may include a first column "Mortgage Index" and a second column "ISDA SIMM bucket."

In examples related to equities assets, and further in the context of single names, users may submit one ISIN for each underlier and a corresponding relevant SIMM bucket in FIG. 3C. By way of example, FIG. 6 is a submission example from a template. As shown in FIG. 6, the submission example includes five columns: "ISIN," "Select ISDA SIMM Bucket," "Issuer Name—per Bloomberg," "Additional Identifier Type," and "Input Identifier," which further includes entry "FR0000121667," "EQ 5," "Essilor International SA," a no-entry, and a no-entry, respectively.

In some examples related to equities assets, and further in context of indices, equity indices may have distinct SIMM risk buckets for "Equity indices," "ETFs," and/or "Funds."

In addition the examples described above, crowdsourcing functionalities may be contemplated for and applied to other types of assets that may require the consistent application of SIMM parameter to input sensitivities for certain asset classes and products.

Various aspects and examples associated with the determination and output of results from the Utility are described below.

At predetermined time intervals, e.g., hourly, daily, weekly, monthly, etc., the Utility may be configured to tally all the votes, such as the voted buckets, and publish a final results report of consensus SIMM buckets for firms to utilize.

For example, the Utility may determine consensus mappings to risk buckets based on the bucket that receives the most votes from the SIMM users. In the event of a split-decision (e.g., a tie vote with no majority), the more punitive bucket in terms or risk weighting may be considered the "winner" or the bucket that is chosen, and reported as the resulting crowdsourced SIMM risk bucket. If a tie vote includes risk buckets with the same risk weighting, the lowest bucket numerically may be considered the winner and will be reported as the resulting crowdsourced SIMM risk bucket. For example, the SIMM risk bucket number 1 ("one") can be considered the lowest numerical bucket. In the event of a split-decision based on the votes in the "Residual" bucket, the SIMM bucket which is outside of the residual bucket may be considered the winner and subsequently chosen as the resulting crowdsourced SIMM risk bucket.

As an example, the Utility can provide a consensus SIMM bucket in the results even when only one vote from a SIMM user is received.

The Utility may provide the output of results at predetermined times, e.g., daily at a certain time, such as 1:00 μm. EST on T+1. For instance, FIG. 7 illustrates an example submissions and results timeline. If the output of the results are provided daily, then the output each day may be based on all relevant votes received prior to that day's cut-off and up to one month prior. Since votes submitted to the crowdsourcing Utility may "expire" after one month, as discussed above, the votes that are considered to be expired would not be tallied by the Utility and therefore not affect the results. In some instances, SIMM users may reserve the right to further assess the timing of the results, such as during industry testing.

The Utility may publish the consensus results, including the number of votes per SIMM bucket. Users of the Utility may also receive all output data, not just the asset underliers they submitted to the Utility. It is envisioned that there may be different tiers of subscribers for reports on results.

In order to ensure that the consensus crowdsourced results are available to users with varying operational capabilities, the Utility may be able to deliver results reports via multiple methods and data platforms, while also taking into account privacy issues during the delivery of the results reports. Data results or reports may periodically be requested by the entity operating the SIMM for purposes of maintaining the integrity of the SIMM, or by SIMM users or regulators for audit purposes.

Various aspects and examples associated with consumption, e.g., application of results by the SIMM users, are described below.

As an example, the data published by the Utility may be used for margin calculations by those parties in scope for margin requirements for uncleared derivatives as part of the broader application of the SIMM.

Institutions, firms, users, and the like must be able to consume (e.g., utilize, analyze, review, etc.) crowdsourcing results, including each underlying asset identifier and corresponding consensus SIMM bucket, from the Utility through FTP, as well as other data delivery channels to be proposed by the Utility.

Utility output results may be applied by firms or end users for risk calculations with a lag of T+2 days. FIG. 7 illustrates a submissions and results timeline. It depicts the timeline of when "Trade A" is executed, for example, and when the firms vote on "Trade A," when firms received the Utility results, and also depicts margin calls. Participants may again reserve the right to further assess this timing of the results, such as during industry testing.

If necessary, in some situations, each institution can override its internal SIMM bucket with the Utility output SIMM buckets for IM calculations, etc.

Various aspects and examples associated with other possible functions of the Crowdsourcing Utility, such as risk factor netting, are described below. As an example, for trades within the same SIMM bucket, proper identifiers may need to be used to net across different security issuances.

For example, in the context of equity assets, the ISIN may be used to net across different stocks traded across multiple exchanges, which is depicted by the chart below:

| ISIN | SEDOL | Bloomberg Ticker | SECURITY_NAME | SIMM BUCKET |
|---|---|---|---|---|
| GB00B03MLX29 | B09CBL4 | RDSA NA | Royal Dutch Shell PLC | 7 |
| GB00B03MLX29 | B03MLX2 | RDSA LN | Royal Dutch Shell PLC | 7 |
| GB0005405286 | 6158163 | 5 HK | HSBC Holdings PLC | 8 |
| GB0005405286 | 0540528 | HSBA LN | HSBC Holdings PLC | 8 |

In another example, in the context of credit qualifying assets, internally maintained issuer fields, such as the TICKER, may be used, as depicted by the chart below. The below chart illustrates that the TICKER provides full offset across different bond issues, whereas the "RED ENTITY CODE" field may not.

| ISIN | CREDIT QUALITY | SIMM BUCKET | SECURITY_NAME | NAME | SHORT_NAME | TICKER | RED ENTITY CODE |
|---|---|---|---|---|---|---|---|
| XS0564563921 | HY | 11 | ALUPP 8 1/2 01/15/16 | ALCATEL-LUCENT | ALCATEL-LUCENT | ALUFP | FF1AAK |
| US549463AC10 | HY | 11 | ALUPP 8 1/2 01/15/28 | ALCATEL-LUCENT USA INC | LUCENT TECH | ALUFP | 014ALT |
| US655422AU70 | IG | 3 | GLENLN 5 1/2 06/15/17 | GLENCORE CANADA CORP | NORANDA INC | GLENLN | 3AFA95 |
| XS0305188533 | IG | 3 | GLENLN 5 1/4 06/13/17 | GLENCORE FINANCE CANADA | XTRATA FIN CAN | GLENLN | GPHAA6 |
| XS0288783979 | IG | 3 | GLENLN 6 1/2 02/27/19 | GLENCORE FINANCE EUROPE | GLENCORE FINANCE | GLENLN | HK5754 |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof. Although the disclosure use terminology and acronyms that may not be familiar to the layperson, those skilled in the art will be familiar with the terminology and acronyms used herein.

What is claimed is:

1. A method for calculating and providing an overall initial margin for non-cleared derivatives using a Standard Initial Margin Model (SIMM), the method comprising the acts of:
   acquiring, by at least one computer, information associated with a plurality of risk classes;
   determining, by the at least one computer, a delta margin, a vega margin, and a curvature margin for each risk class based on the acquired information associated with the plurality of risk classes;
   calculating, by the at least one computer, initial margin for each risk class by summing the respective delta margin, the respective vega margin, and the respective curvature margin;
   determining, by the at least one computer, whether product classes will be used in calculating the overall initial margin;
   calculating, by the at least one computer, the overall initial margin using an equation based on the determination; and
   providing, by the at least one computer, the overall initial margin.

2. The method of claim 1, wherein the plurality of risk classes includes at least: (i) interest rate, (ii) credit-qualifying, (iii) credit-non-qualifying, (iv) equity, (v) commodity, and (vi) foreign exchange (FX).

3. The method of claim 2, wherein the information associated with the plurality of risk classes includes one or more predefined risk factors and one or more sensitivities.

4. The method of claim 3, wherein the information associated with the plurality of risk classes includes one or more interest rate risk weights and one or more interest rate correlations.

5. The method of claim 3, wherein the information associated with the plurality of risk classes includes one or more credit-qualifying risk weights and one or more credit-qualifying correlations.

6. The method of claim 3, wherein the information associated with the plurality of risk classes includes one or more credit-non-qualifying risk weights and one or more credit-non-qualifying correlations.

7. The method of claim 3, wherein the information associated with the plurality of risk classes includes one or more equity risk weights and one or more equity correlations.

8. The method of claim 3, wherein the information associated with the plurality of risk classes includes one or more commodity risk weights and one or more commodity correlations.

9. The method of claim 3, wherein the information associated with the plurality of risk classes includes one or more FX risk weights and one or more FX correlations.

10. The method of claim 3, wherein the information associated with the plurality of risk classes includes one or more concentration thresholds.

11. The method of claim 1, where the initial margin for each risk class is defined by:
$IM_x = DeltaMargin_x + VegaMargin_x + CurvatureMargin_x$,
wherein IM is the initial margin, x is each risk class, $DeltaMargin_x$ is the delta margin for each risk class, $VegaMargin_x$ is the vega margin for each risk class, and $CurvatureMargin_x$ is the curvature margin for each risk class.

12. The method of claim 11, wherein the equation used for calculating the overall initial margin when product classes will not be used is defined by:
$SIMM = IM_{IR\&FX} + IM_{Credit} + IM_{Equity} + IM_{Commodity}$,
wherein SIMM is the overall initial margin.

13. The method of claim 12, wherein $IM_{IR\&FX} = (IM_{IR}^2 + IM_{FX}^2 + 2\psi_{IRFX} IM_{IR} IM_{FX})^{1/2}$.

14. The method of claim 12, wherein
$IM_{Credit} = (IM_{CreditQual}^2 + IM_{CreditNonQual}^2 + 2\psi_{Credit} IM_{CreditQual} IM_{CreditNonQual})^{1/2}$.

15. The method of claim 11, wherein the equation used for calculating the overall initial margin when product classes will be used is defined by:
$SIMM = SIMM_{RatesFX} + SIMM_{Credit} + SIMM_{Equity} + SIMM_{Commodity}$, wherein SIMM is the overall initial margin.

16. The method of claim 15, wherein the product classes include: (i) interest rates and foreign exchange (RatesFX), (ii) credit, (iii) equity, and (iv) commodity.

17. The method of claim 16, wherein the margin for each of the product classes is defined by: $SIMM_{product} = \sqrt{\sum_r IM_r^2 + \sum_r \sum_{s \neq r} \psi_{rs} IM_r IM_s}$, wherein $SIMM_{product}$ is the margin for one of the product classes.

18. The method of claim 1, wherein the act of providing the overall initial margin includes displaying, by the at least one computer, the overall initial margin on a display device.

19. A non-transitory computer-readable medium comprising a set of executable instructions, the set of executable instructions when executed by at least one processor causes the at least one processor to perform to perform a method for calculating and providing an overall initial margin for non-cleared derivatives using a Standard Initial Margin Model (SIMM), the method comprising the acts of:
acquiring information associated with a plurality of risk classes;
determining a delta margin, a vega margin, and a curvature margin for each risk class based on the acquired information associated with the plurality of risk classes;
calculating initial margin for each risk class by summing the respective delta margin, the respective vega margin, and the respective curvature margin;
determining whether product classes will be used in calculating the overall initial margin;
calculating the overall initial margin using an equation based on the determination; and
providing the overall initial margin.

20. A system for calculating and providing an overall initial margin for non-cleared derivatives using a Standard Initial Margin Model (SIMM), the system comprising:
at least one computer executing stored programmable instructions to:
acquire information associated with a plurality of risk classes;
determine a delta margin, a vega margin, and a curvature margin for each risk class based on the acquired information associated with the plurality of risk classes;
calculate initial margin for each risk class by summing the respective delta margin, the respective vega margin, and the respective curvature margin;
determine whether product classes will be used in calculating the overall initial margin;
calculate the overall initial margin using an equation based on the determination; and
provide the overall initial margin.

21. The method of claim 1, wherein the information associated with a plurality of risk classes is maintained using a mapping table, the method further comprising transmitting, by the at least one computer, the mapping table to a plurality of users.

22. The method of claim 21, wherein the mapping table is updated based on at least one or more votes from the plurality of users so that the information associated with a plurality of risk classes is consistent among the plurality of users.

* * * * *